United States Patent
Kojima et al.

(10) Patent No.: US 11,817,793 B2
(45) Date of Patent: Nov. 14, 2023

(54) POWER CONVERTER AND CAPACITOR MODULE

(71) Applicant: DENSO CORPORATION, Kariya (JP)

(72) Inventors: Kazunari Kojima, Kariya (JP);
Takashi Kurihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 370 days.

(21) Appl. No.: 17/062,938

(22) Filed: Oct. 5, 2020

(65) Prior Publication Data

US 2021/0021203 A1 Jan. 21, 2021

Related U.S. Application Data

(63) Continuation of application No. PCT/JP2019/008733, filed on Mar. 6, 2019.

(30) Foreign Application Priority Data

Apr. 3, 2018 (JP) .................................. 2018-071675
Apr. 25, 2018 (JP) .................................. 2018-084045

(51) Int. Cl.
*H02M 7/00* (2006.01)
*H01G 2/02* (2006.01)
(Continued)

(52) U.S. Cl.
CPC .............. *H02M 7/003* (2013.01); *H01G 2/02* (2013.01); *H01G 4/224* (2013.01); *H01G 4/228* (2013.01)

(58) Field of Classification Search
CPC .......... H01G 4/228; H01G 4/224; H01G 2/02; H02M 7/003
See application file for complete search history.

(56) References Cited

U.S. PATENT DOCUMENTS

2007/0109715 A1\* 5/2007 Azuma .................. B60L 50/40
361/299.3
2011/0228445 A1\* 9/2011 Abe ........................ H01G 4/38
361/328

(Continued)

FOREIGN PATENT DOCUMENTS

JP   2012-191767 A   10/2012
JP   2014-045035 A   3/2014
JP   2016-158358 A   9/2016

OTHER PUBLICATIONS

May 28, 2019 International Search Report issued in International Patent Application No. PCT/JP2019/008733.

*Primary Examiner* — David M Sinclair
(74) *Attorney, Agent, or Firm* — Oliff PLC

(57) ABSTRACT

A power converter includes a switching circuit and a capacitor module. The capacitor module includes a capacitor element, a capacitor case, an encapsulating resin, and a capacitor bus bar. The capacitor bus bar includes an element connection section, which is connected to the capacitor element inside the encapsulating resin, a terminal connection section, which is connected to a power terminal outside the encapsulating resin, and a power supply connection section, which is connected to power supply wiring outside the encapsulating resin. The power supply wiring is electrically connected to a DC power supply. The capacitor bus bar includes a DC path, which constitutes a current path between the terminal connection section and the power supply connection section. The DC path is exposed to the outside of the encapsulating resin.

6 Claims, 19 Drawing Sheets

(51) Int. Cl.
*H01G 4/228* (2006.01)
*H01G 4/224* (2006.01)

(56) References Cited

U.S. PATENT DOCUMENTS

| | | | |
|---|---|---|---|
| 2011/0228508 A1* | 9/2011 | Inuduka | H01G 4/228 |
| | | | 361/811 |
| 2011/0304948 A1* | 12/2011 | Lee | H01G 11/10 |
| | | | 361/301.1 |
| 2014/0085955 A1 | 3/2014 | Maeda et al. | |
| 2014/0285969 A1 | 9/2014 | Kojima et al. | |

* cited by examiner

POWER CONVERTER AND CAPACITOR MODULE

CROSS-REFERENCE TO RELATED APPLICATION

This application is based on and claims the benefit of priority from earlier Japanese Patent Application Nos. 2018-071675 filed Apr. 3, 2018 and 2018-084045 filed Apr. 25, 2018, the descriptions of which are incorporated herein by reference.

BACKGROUND

Technical Field

The present disclosure relates to a power converter including a switching circuit and a capacitor module and to the capacitor module.

Related Art

For example, a power converter such as an inverter provided to electric cars and hybrid cars includes a switching circuit and a capacitor module.

SUMMARY

As an aspect of the present disclosure, a power converter is provided which includes: a switching circuit; a capacitor module which is electrically connected to the switching circuit, an auxiliary capacitor module which is parallel-connected to the capacitor module, and a device case which accommodates the switching circuit, the capacitor module, and the auxiliary capacitor module.

The capacitor module includes a capacitor element, a capacitor case which accommodates the capacitor element, an encapsulating resin which encapsulates the capacitor element in the capacitor case, and a capacitor bus bar which connects the capacitor element to a power terminal of the switching circuit.

The capacitor bus bar includes an element connection section which is connected to the capacitor element inside the encapsulating resin, a terminal connection section which is connected to the power terminal outside the encapsulating resin, and a power supply connection section which is connected to power supply wiring outside the encapsulating resin, the power supply wiring being electrically connected to a DC power supply.

The capacitor bus bar includes a DC path which constitutes a current path between the terminal connection section and the power supply connection section, and the DC path is exposed to the outside of the encapsulating resin.

The auxiliary capacitor module is connected to the power supply connection section of the capacitor bus bar.

The auxiliary capacitor module is detachably secured to the power supply connection section with a fastening member.

A securing direction of a securing member, which secures the auxiliary capacitor module, and a securing direction of the fastening member are the same as each other.

DETAILED DESCRIPTION OF THE PREFERRED EMBODIMENTS

For example, a power converter such as an inverter provided to electric cars and hybrid cars includes a switching circuit and a capacitor module. Japanese Laid-Open Patent Publication No. 2014-207427 discloses a capacitor module that encapsulates capacitor elements with an encapsulating resin. In the above disclosure, the capacitor module is connected to the switching circuit with a bus bar (hereinafter, referred to as a capacitor bus bar).

The capacitor bus bar is also electrically connected to a DC power supply in addition to the capacitor elements and the switching circuit. That is, the capacitor bus bar serves as a current path between the DC power supply and the switching circuit, a current path between the DC power supply and the capacitor, and a current path between the capacitor and the switching circuit.

The power converter disclosed in Japanese Laid-Open Patent Publication No. 2014-207427 has the following problems.

That is, as power converters with higher power output have been developed in recent years, there has been a trend towards an increase in the current flowing from the DC power supply to the switching circuit. This is likely to increase the amount of heat generated in the capacitor bus bar.

In the power converter disclosed in Japanese Laid-Open Patent Publication No. 2014-207427, part of the capacitor bus bar is located in the encapsulating resin of the capacitor module. A section of the capacitor bus bar connected to the switching circuit and a section of the capacitor bus bar connected to the DC power supply are exposed from different parts of the encapsulating resin. Thus, the current that flows from the DC power supply to the switching circuit temporarily passes inside the encapsulating resin of the capacitor module. Unfortunately, if a large current flows through this current path, the dissipation of heat due to the current may be hindered. Furthermore, the amount of heat transmitted to the capacitor elements is likely to increase, which may possibly increase the temperature of the capacitor elements.

It is an object of the present disclosure to provide a power converter and a capacitor module in which heat of a capacitor bus bar is easily dissipated efficiently and the increase in the temperature of capacitor elements is easily inhibited.

First Embodiment

A power converter according to an embodiment will be described with reference to FIGS. 1 to 12.

Figure 1:
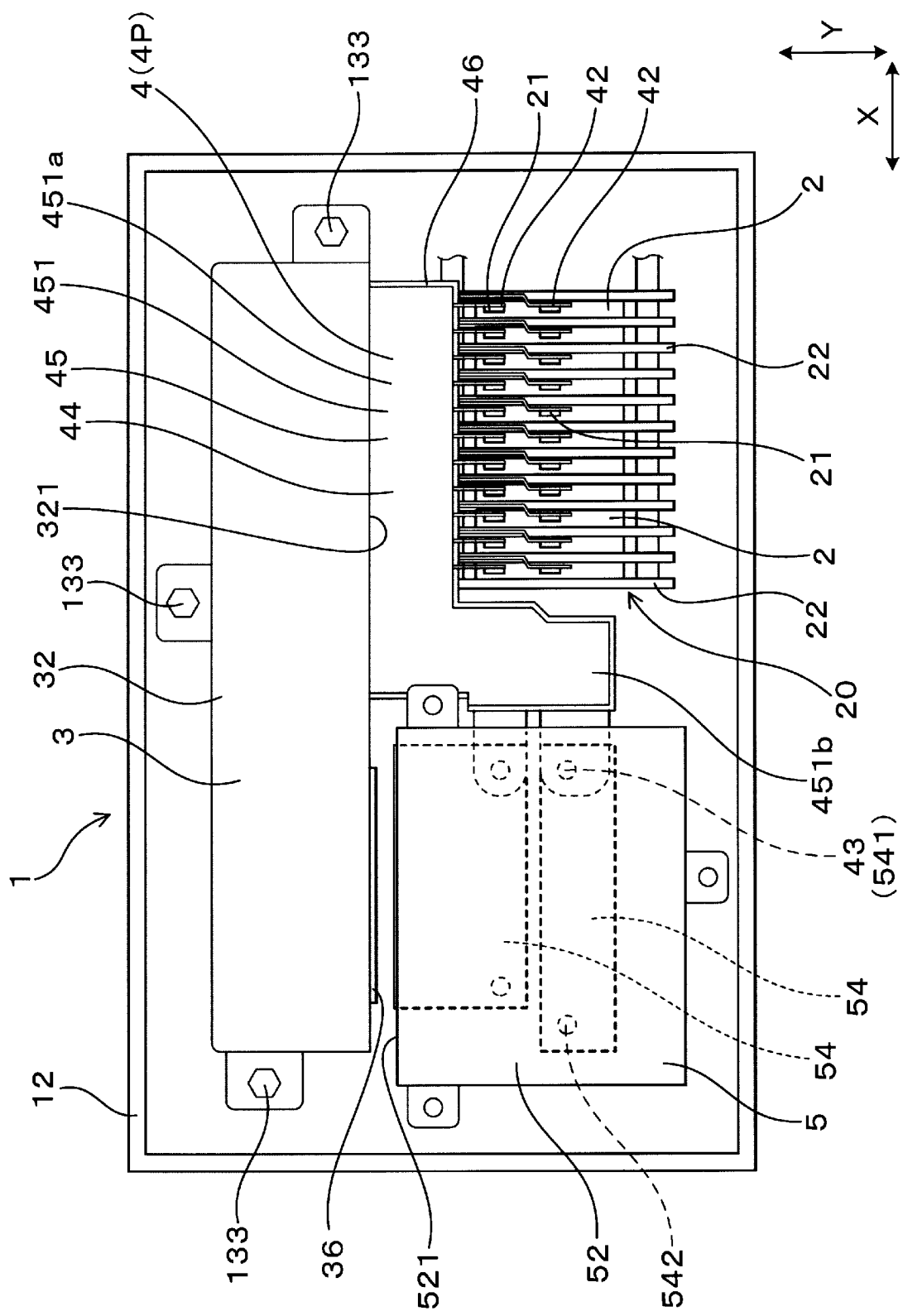
FIG. 1 is an explanatory plan view of a power converter according to a first embodiment.
Figure 2:
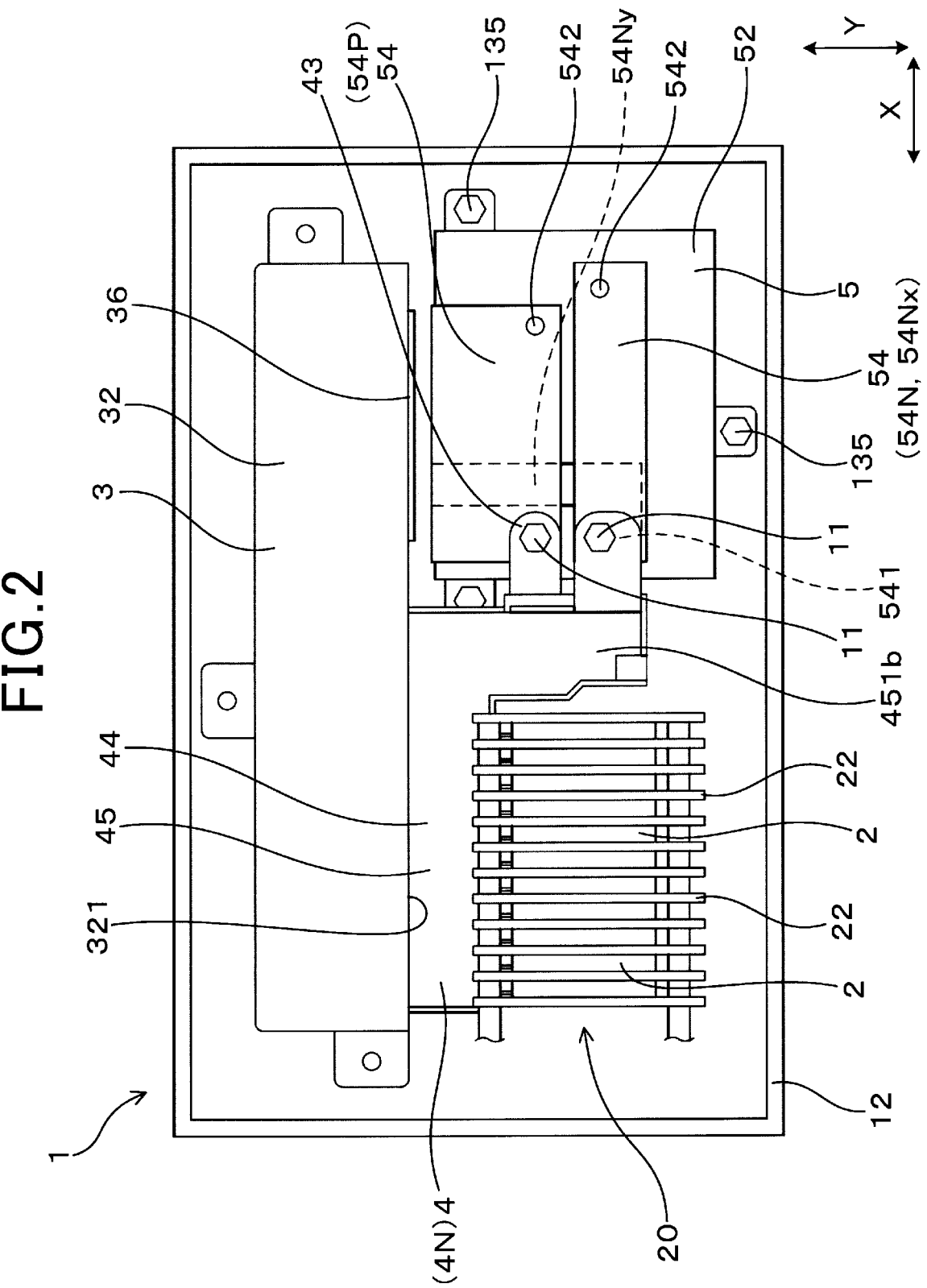
FIG. 2 is an explanatory plan view of the power converter according to the first embodiment as viewed from the opposite side of the view in FIG. 1.
Figure 3:
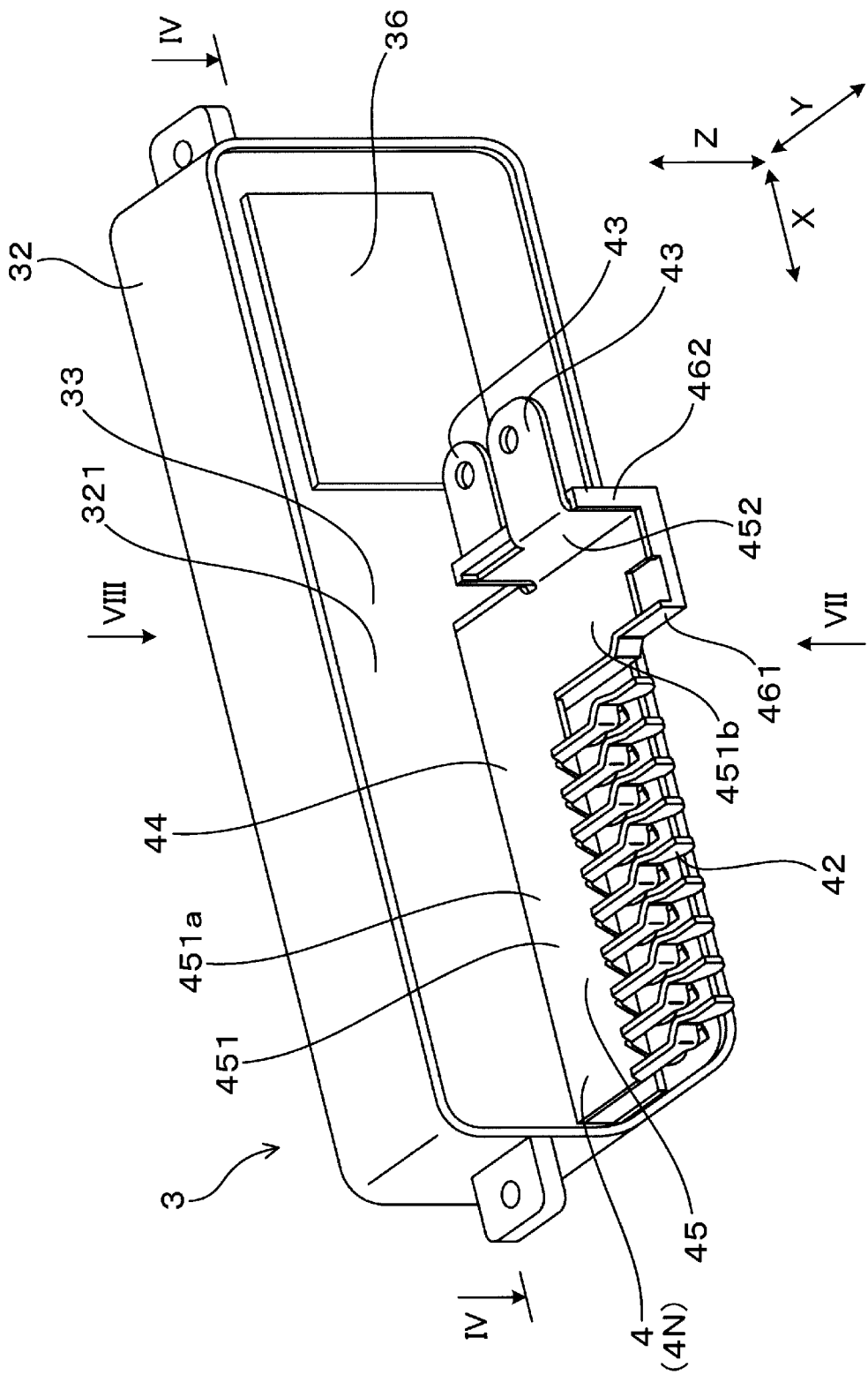
FIG. 3 is a perspective view of a capacitor module according to the first embodiment.

As shown in FIGS. 1 and 2, a power converter 1 of the present embodiment includes a switching circuit 20 and a capacitor module 3, which is electrically connected to the switching circuit 20.

As shown in FIGS. 3 to 8, the capacitor module 3 includes capacitor elements 31, a capacitor case 32, an encapsulating resin 33, and capacitor bus bars 4. The capacitor case 32 accommodates the capacitor elements 31. The encapsulating resin 33 encapsulates the capacitor elements 31 in the capacitor case 32. The capacitor bus bars 4 connect the capacitor elements 31 to power terminals 21 of the switching circuit 20 (see FIG. 1).

Figure 4:
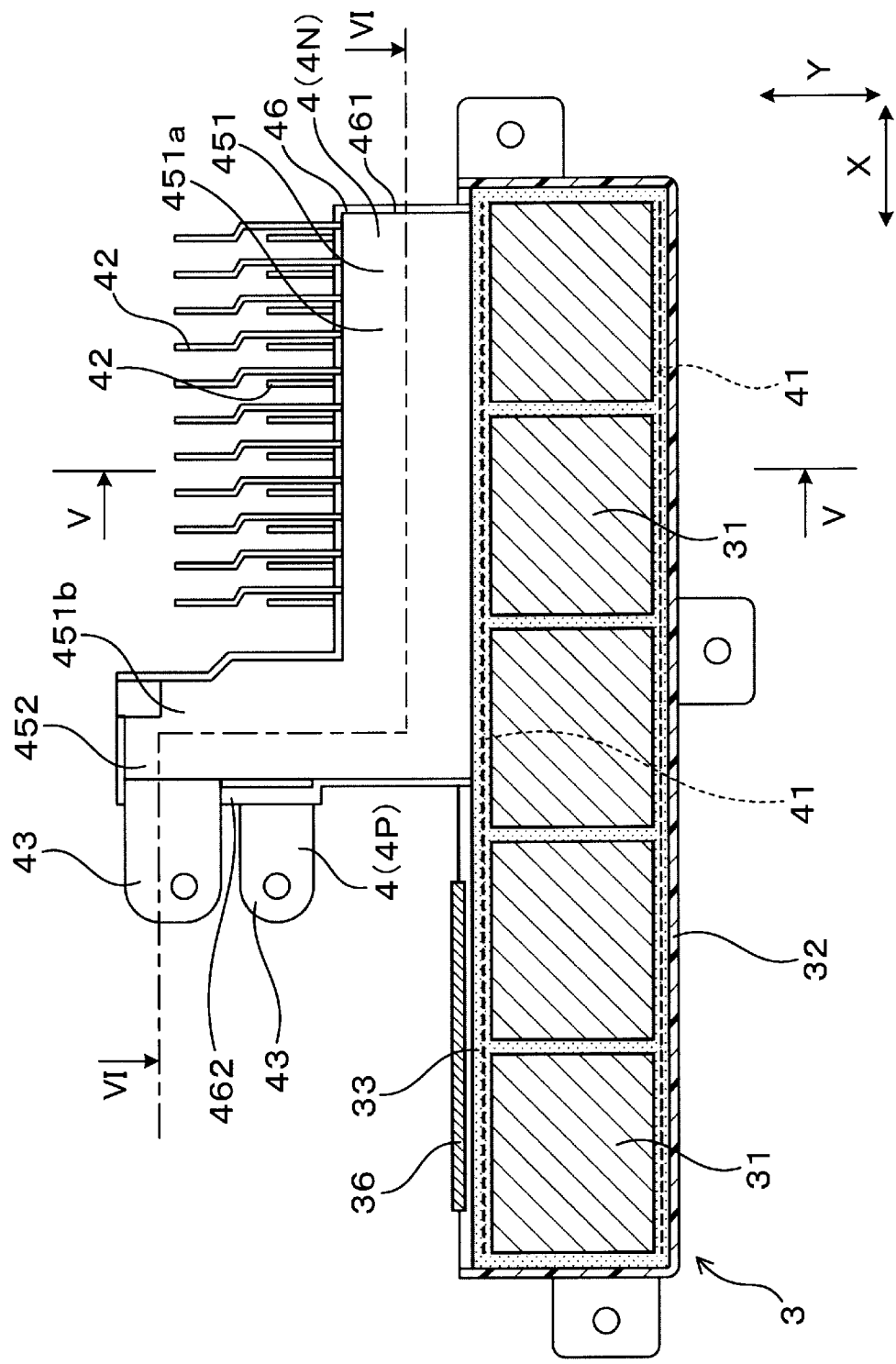
FIG. 4 is a cross-sectional view taken in the direction of arrows along line IV-IV of FIG. 3.
Figure 5:
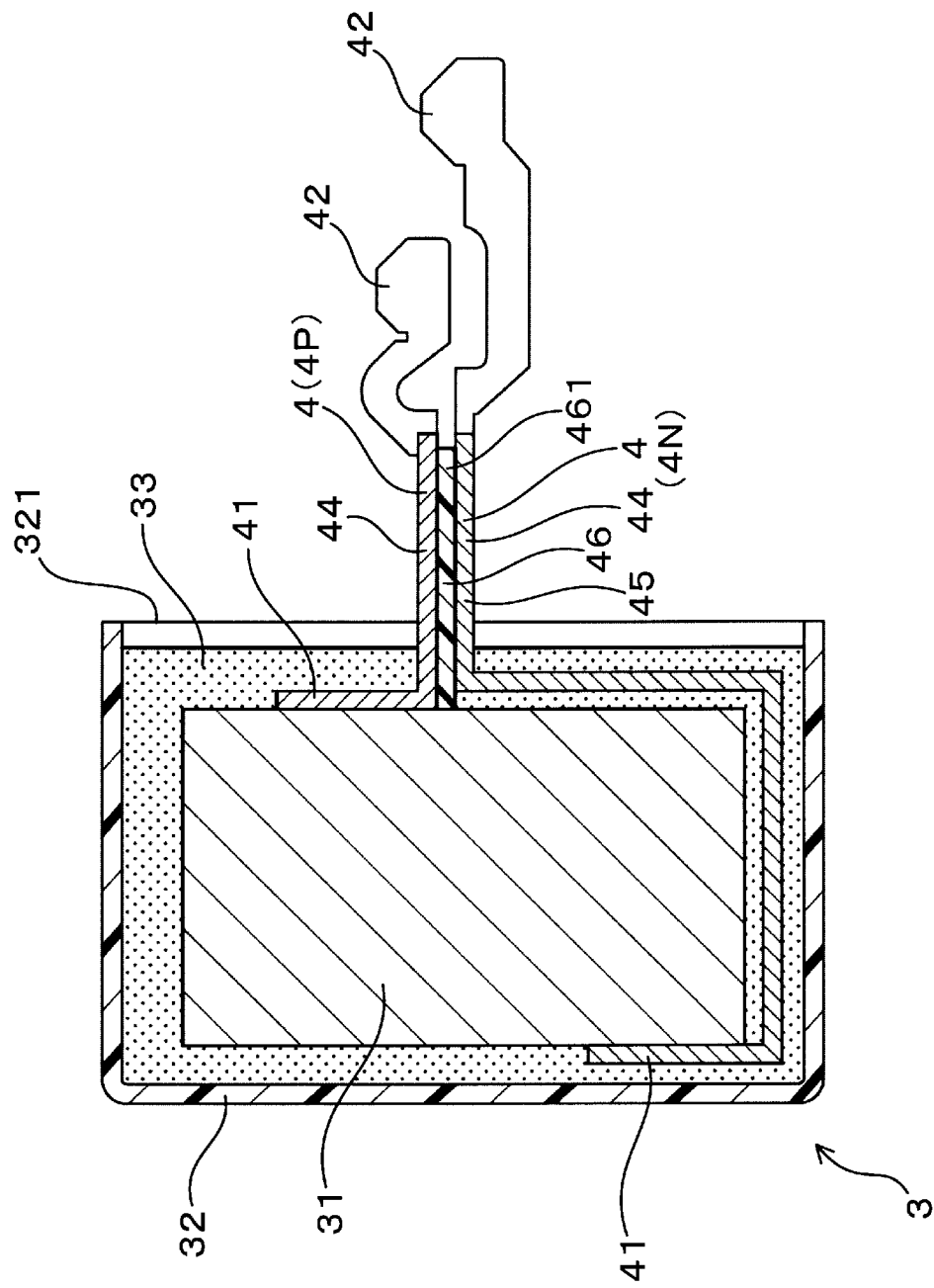
FIG. 5 is a cross-sectional view taken in the direction of arrows along line V-V of FIG. 4.

As shown in FIGS. 4 and 5, each capacitor bus bar 4 includes an element connection section 41, terminal connection sections 42, and a power supply connection section 43. The element connection section 41 is connected to the capacitor elements 31 inside the encapsulating resin 33. The terminal connection sections 42 are sections to be connected to the power terminals 21 outside the encapsulating resin 33. The power supply connection section 43 is connected to power supply wiring, which is electrically connected to the DC power supply, outside the encapsulating resin 33. In the present embodiment, the power supply wiring includes auxiliary bus bars 54, which will be discussed below (see FIG. 2).

As shown in FIGS. 1 to 4, each capacitor bus bar 4 includes a DC path 44, which configures a current path between the terminal connection sections 42 and the power supply connection section 43. The DC path 44 is exposed to the outside of the encapsulating resin 33.

Figure 9:
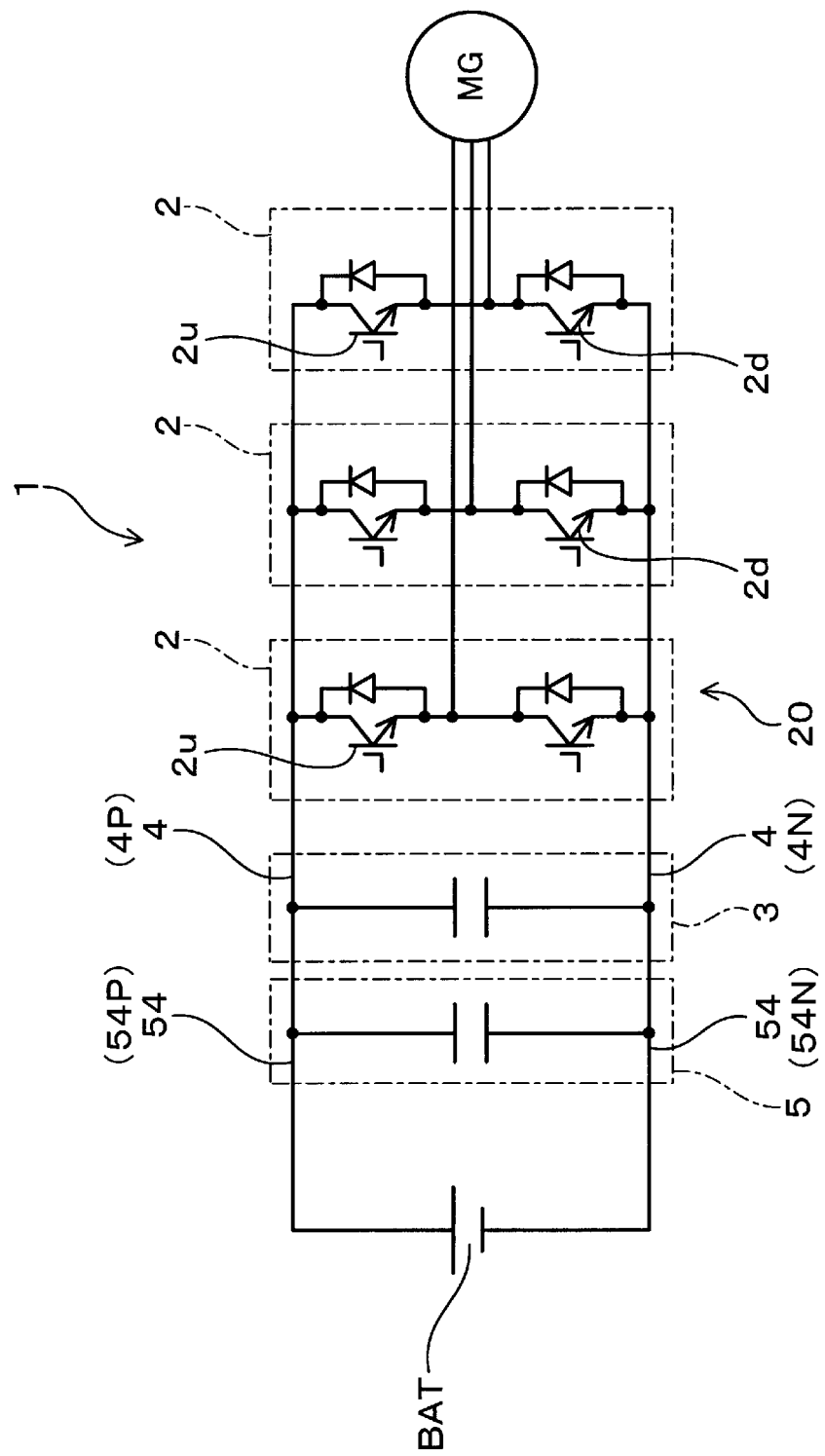
FIG. 9 is a circuit diagram of the power converter according to the first embodiment.

The power converter 1 of the present embodiment is mounted on a vehicle such as an electric car and a hybrid car and is connected between a DC power supply BAT and an alternating rotating electrical machine MG as shown in the circuit diagram of FIG. 9. The power converter 1 is configured to convert power between DC power and AC power by switching the switching circuit 20.

The switching circuit 20 includes semiconductor modules 2 each equipped with switching elements 2u and 2d. The semiconductor modules 2 are stacked together with cooling pipes 22 as shown in FIGS. 1 and 2. The cooling pipes 22 each include a refrigerant flow passage. The refrigerant flow passages of the cooling pipes 22 are coupled with one another.

In each semiconductor module 2, the power terminal 21 projects in a direction orthogonal to a stacking direction X. The terminal connection sections 42 of each capacitor bus bar 4 are connected to these power terminals 21. Hereinafter, the stacking direction X is also simply referred to as an X-direction. The projecting direction of the power terminals 21 is referred to as a Z-direction as required, and the direction orthogonal to the X-direction and the Z-direction is referred to as a Y-direction as required.

The semiconductor modules 2 are located next to the capacitor module 3 in the Y-direction. The capacitor module 3 has an elongated shape extending in the X-direction. The stack of the semiconductor modules 2 (that is, the switching circuit 20) faces the capacitor module 3 in the Y-direction along a region substantially half the length of the capacitor module 3. The capacitor module 3 is located so that an opening 321 of the capacitor case 32 faces the switching circuit 20 in the Y-direction. That is, a potting surface of the encapsulating resin 33 faces the switching circuit 20 in the Y-direction.

Each semiconductor module 2 is equipped with switching elements, which are an upper-arm switching element 2u and a lower-arm switching element 2d as shown in FIG. 9. The upper-arm switching element 2u and the lower-arm switching element 2d are series connected with each other. The high-potential sides of the upper-arm switching elements 2u are connected to positive electrode power terminals 21, and the low-potential sides of the lower-arm switching elements 2d are connected to negative electrode power terminals 21. The connection section between the upper-arm switching element 2u and the lower-arm switching element 2d is connected to a non-illustrated output AC terminal. The AC terminals are connected to the rotating electrical machine MG.

As shown in FIGS. 3 to 9, the capacitor bus bars 4 include a positive electrode bus bar 4P and a negative electrode bus bar 4N, which are connected to opposite electrodes of the capacitor elements 31. The terminal connection sections 42 of the positive electrode bus bar 4P are connected to the positive electrode power terminals 21, and the terminal connection sections 42 of the negative electrode bus bar 4N are connected to the negative electrode power terminals 21. Additionally, the power supply connection section 43 of the positive electrode bus bar 4P is electrically connected to the positive electrode of the DC power supply BAT, and the power supply connection section 43 of the negative electrode bus bar 4N is electrically connected to the negative electrode of the DC power supply BAT.

The power converter 1 includes, as shown in FIGS. 1, 2, and 9, an auxiliary capacitor module 5, which is parallel-connected to the capacitor module 3. The auxiliary capacitor module 5 is connected to the power supply connection sections 43 of the capacitor bus bars 4. Thus, the capacitor module 3 and the auxiliary capacitor module 5 are parallel-connected to each other. As shown in FIG. 2, the auxiliary capacitor module 5 is detachably secured to the power supply connection sections 43 with fastening members 11.

As shown in FIGS. 1 and 2, the auxiliary capacitor module 5 is located next to the capacitor module 3 in the Y-direction and is located next to the switching circuit 20 in the X-direction.

Figure 10:
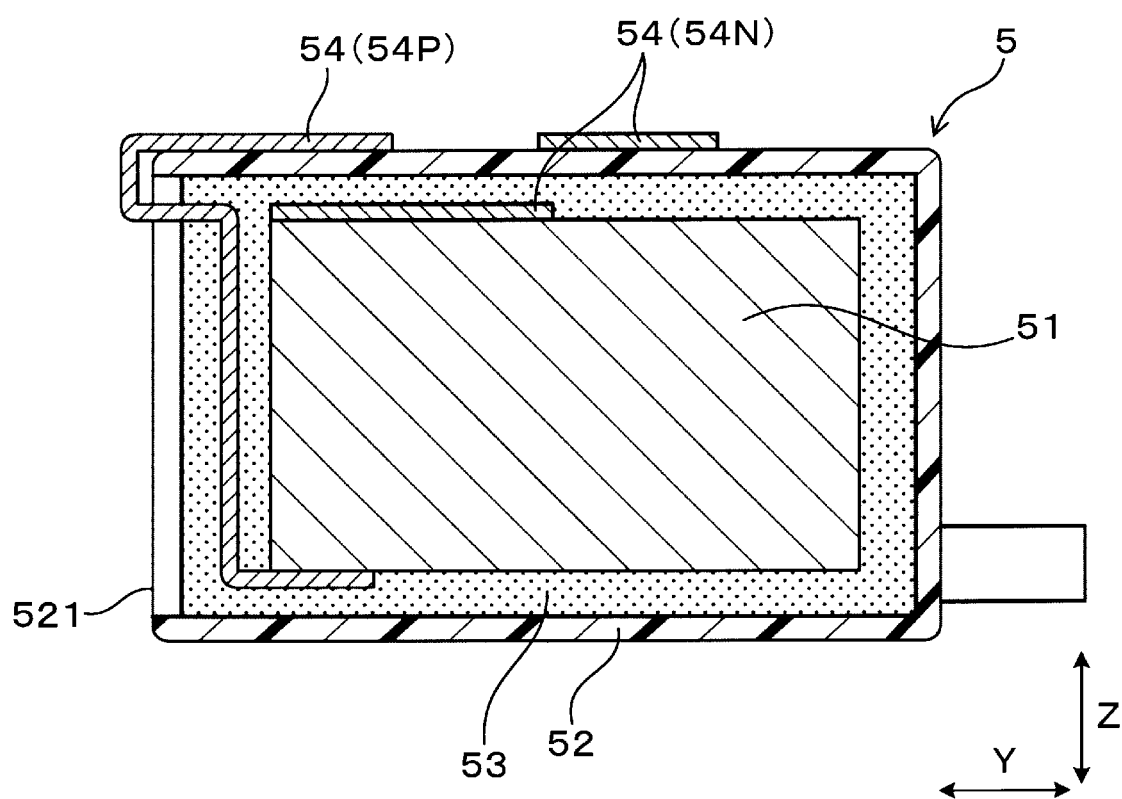
FIG. 10 is an explanatory cross-sectional view of an auxiliary capacitor module according to the first embodiment.

As shown in FIG. 10, the auxiliary capacitor module 5 is also equipped with capacitor elements 51 located inside a capacitor case 52 like the capacitor module 3. The capacitor elements 51 are encapsulated by an encapsulating resin 53 in the capacitor case 52. The capacitor case 52 includes an opening 521, which faces the capacitor module 3 in the Y-direction. That is, the auxiliary capacitor module 5 is located so that a potting surface of the encapsulating resin 53 faces the capacitor module 3 in the Y-direction.

The auxiliary capacitor module 5 includes a pair of auxiliary bus bars 54. The pair of auxiliary bus bars 54 are respectively connected to a pair of electrodes of each capacitor element 51. The auxiliary bus bars 54 extend on the outer surface of the capacitor case 52. A positive-side auxiliary bus bar 54P projects from the opening 521 of the capacitor case 52 and extends to the outer surface of the capacitor case 52. Although not shown in FIG. 10, a negative-side auxiliary bus bar 54N also projects from the opening 521 and extends to the outer surface of the capacitor case 52 in the same manner. As shown mainly by a broken line in FIG. 2, the auxiliary bus bar 54N includes a Y-direction extended portion 54Ny, which extends in the Y-direction. The Y-direction extended portion 54Ny overlaps the positive-side auxiliary bus bar 54P in the thickness direction while being kept insulated from the positive-side auxiliary bus bar 54P. The auxiliary bus bar 54N includes an X-direction extended portion 54Nx, which overlaps and is connected to a part of the Y-direction extended portion 54Ny. The X-direction extended portion 54Nx is located on the outer surface of the capacitor case 52 to extend in the X-direction. In the present embodiment, the Y-direction extended portion 54Ny and the X-direction extended portion 54Nx are formed by separate members from each other.

As shown in FIGS. 2 and 9, the power supply connection sections 43 of the capacitor bus bars 4 are connected to the DC power supply BAT through the auxiliary bus bars 54. That is, each auxiliary bus bar 54 includes, at one end, a first connection section 541, which is connected to the associated capacitor bus bar 4. The first connection section 541 is connected to the power supply connection section 43 of the associated capacitor bus bar 4 with the associated fastening member 11. Each auxiliary bus bar 54 also includes a second connection section 542 at the other end. The connection wiring from the DC power supply BAT is connected to the second connection sections 542.

The power converter 1 includes a device case 12, which accommodates the switching circuit 20, the capacitor module 3, and the auxiliary capacitor module 5. As shown in FIG. 1, the capacitor module 3 is secured to the device case 12 with securing members 133. As shown in FIG. 2, the auxiliary capacitor module 5 is secured to the device case 12 with securing members 135.

The securing direction of the securing members 135, which secure the auxiliary capacitor module 5, and the securing direction of the fastening members 11 are the same. That is, the securing members 135 and the fastening members 11 are fastened in the direction from the front to the rear of the sheet of FIG. 2. The securing direction of the securing members 133, which secure the capacitor module 3 shown in FIG. 1, is opposite to the securing direction of the securing members 135 and the fastening members 11.

In the present embodiment, both the fastening members 11 and the securing members 133 and 135 may be bolts.

Figure 6:
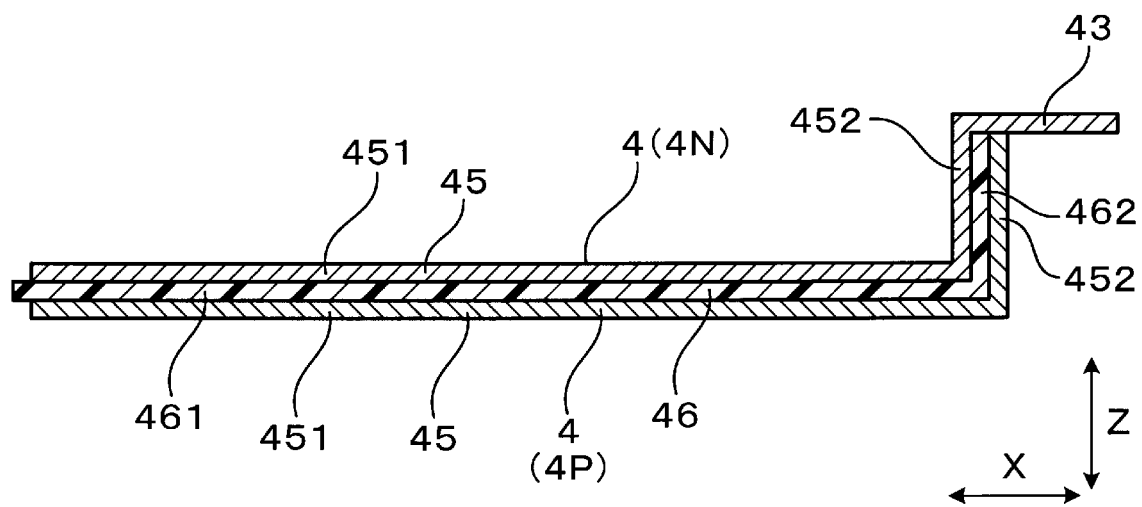
FIG. 6 is a cross-sectional view taken in the direction of arrows along line VI-VI of FIG. 4.

As described above, the capacitor module 3 includes the capacitor bus bars 4, which are the positive electrode bus bar 4P and the negative electrode bus bar 4N. As shown in FIGS. 5 and 6, the positive electrode bus bar 4P and the negative electrode bus bar 4N each include a facing section 45 at part of their respective DC paths 44. The facing sections 45 face each other in the thickness direction with the insulation layer 46 located in between. The power supply connection section 43 projects from the facing section 45 and the insulation layer 46 when viewed in the thickness direction (Z-direction in the present embodiment). The power supply connection section 43 projects from the facing section 45 and the insulation layer 46 to one side in the X-direction.

The facing section 45 includes a flat plate-like main facing section 451 and an upright facing section 452. The upright facing section 452 extends upright from the main facing section 451 in the thickness direction of the main facing section 451 (that is, in the Z-direction). The insulation layer 46 includes a main insulation section 461 and an upright insulation section 462. The main insulation section 461 is located between the pair of main facing sections 451. The upright insulation section 462 is located between the pair of upright facing sections 452.

The power supply connection section 43 is bent from the upright facing section 452 in the thickness direction of the upright facing section 452 (that is, in the X-direction). The power supply connection section 43 is formed to be parallel to the main facing section 451. The fact that the power supply connection section 43 and the main facing section 451 are parallel to each other means that the thickness direction of the power supply connection section 43 is substantially the same as the thickness direction of the main facing section 451. The insulation layer 46 is formed of a resin molded body.

Figure 7:
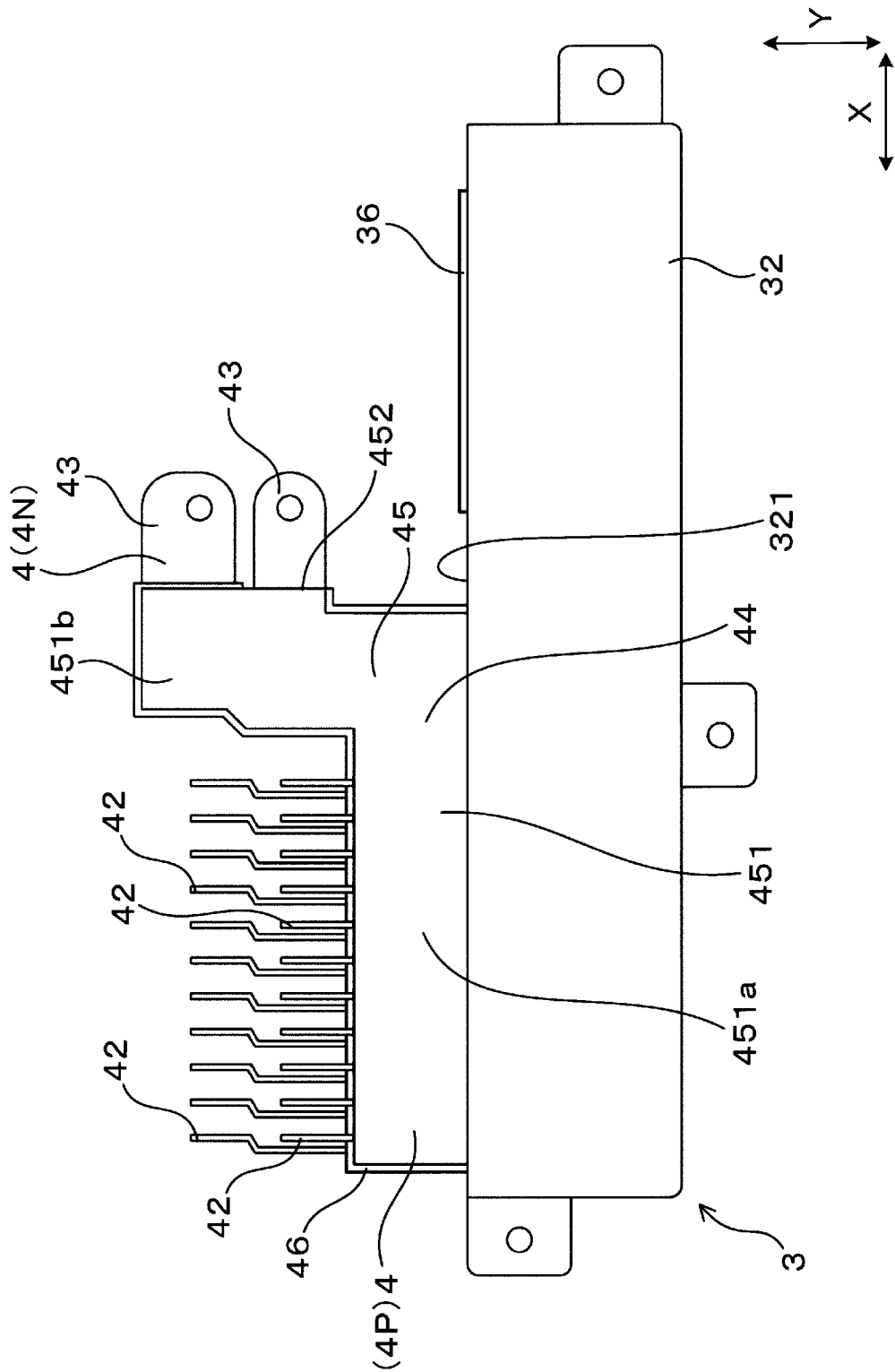
FIG. 7 is a view from VII in FIG. 3.
Figure 8:
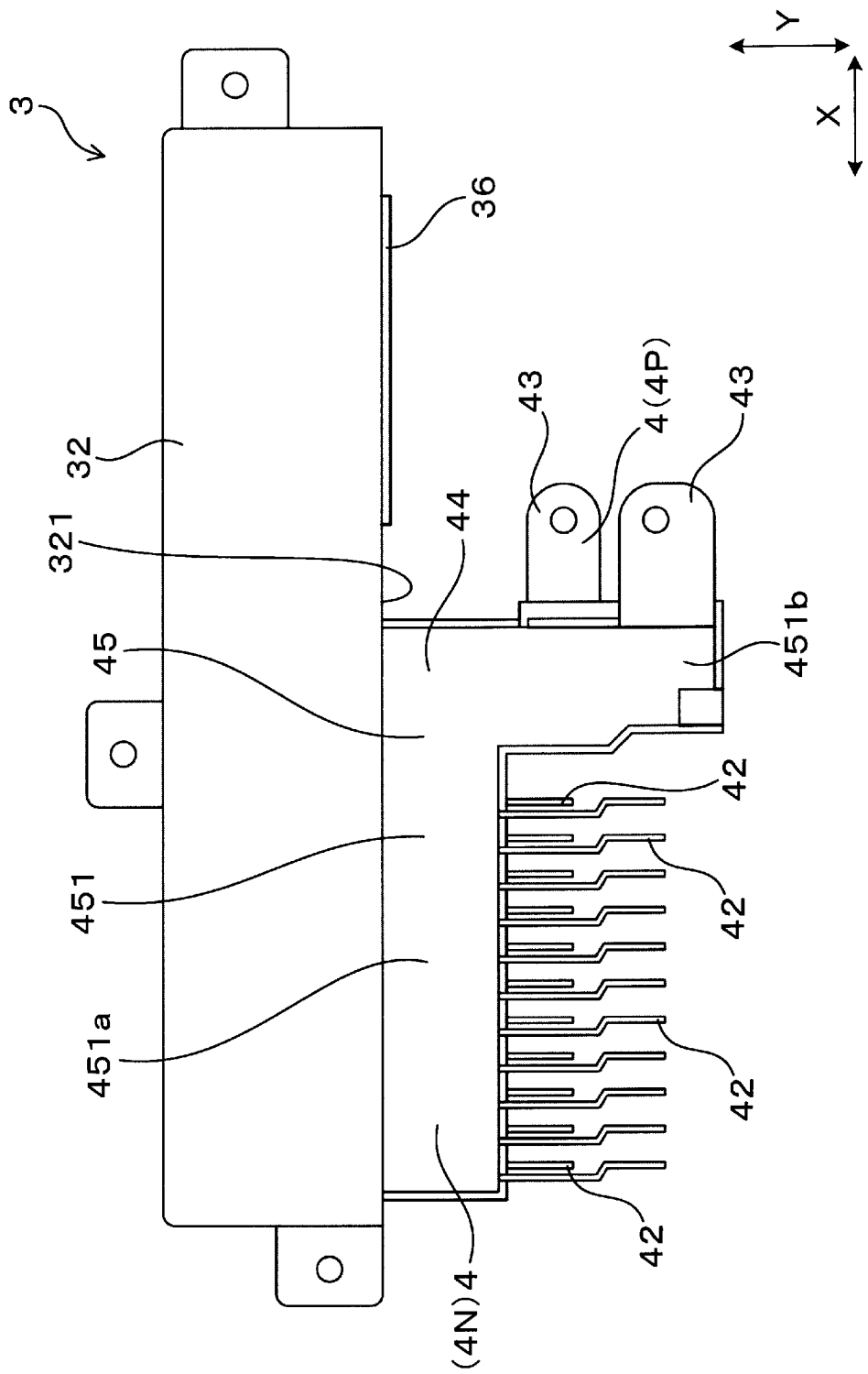
FIG. 8 is a view from VIII in FIG. 3.

As shown in FIGS. 4, 7, and 8, the main facing section 451 includes an elongated facing section 451a, which extends in the X-direction, and a projecting facing section 451b, which projects from the end of the elongated facing section 451a in the X-direction to extend away from the capacitor elements 31 in the Y-direction. The terminal connection sections 42 project from the elongated facing section 451a to the side further from the capacitor elements 31 in the Y-direction. The upright facing section 452 extends upright from the edge of the projecting facing section 451b further from the terminal connection sections 42 in the Y-direction.

A discharge substrate 36 is located on part of the region of the capacitor module 3 in the X-direction where the capacitor bus bar 4 does not project. The discharge substrate 36 is electrically connected to the capacitor elements 31 in the capacitor module 3. The discharge substrate 36 is configured to discharge electrical charge that is charged to the capacitor module 3.

Next, the operational advantages of the present embodiment will be described.

Figure 11:
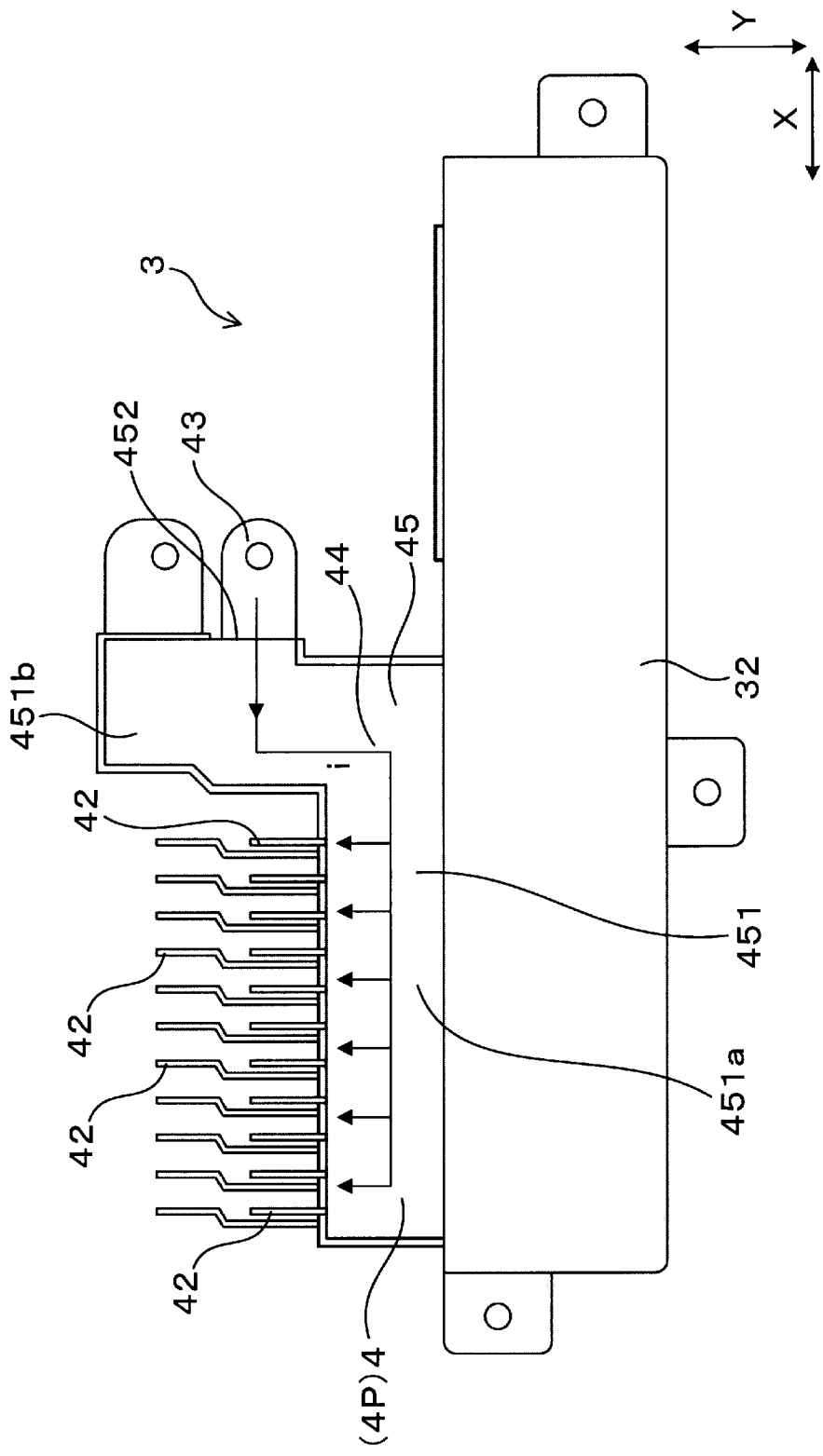
FIG. 11 is an explanatory diagram illustrating a current path in a capacitor bus bar (positive electrode bus bar) according to the first embodiment.
Figure 12:
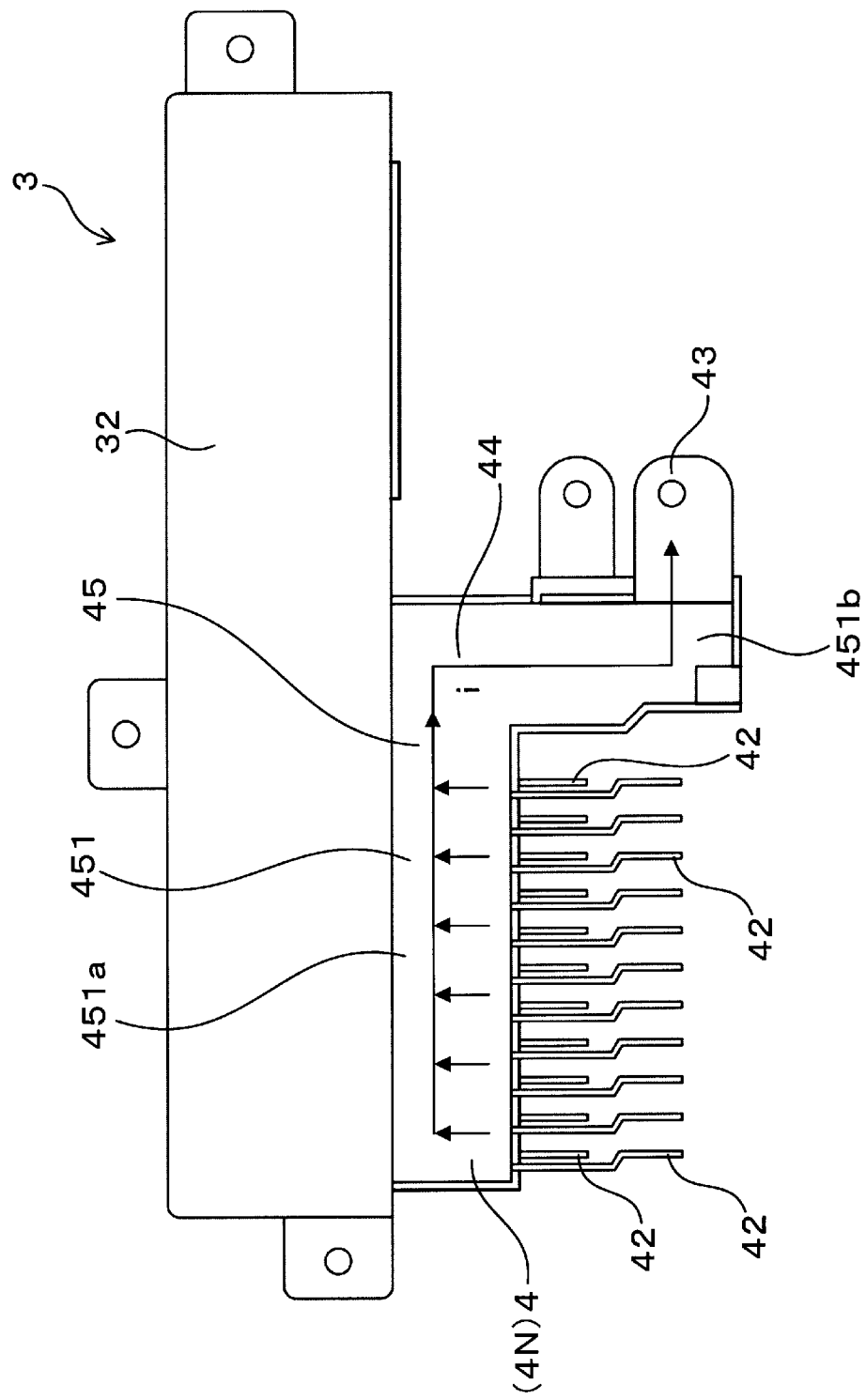
FIG. 12 is an explanatory diagram illustrating a current path in a capacitor bus bar (negative electrode bus bar) according to the first embodiment.

In the power converter 1, the DC path 44, which constitutes the current path between the terminal connection sections 42 and the power supply connection section 43 in each capacitor bus bar 4, is exposed to the outside of the encapsulating resin 33. Thus, if a large current flows through the DC paths 44, which extend from the power supply connection section 43 to the terminal connection sections 42, as shown in FIGS. 11 and 12, heat caused by the current is easily dissipated efficiently. This prevents the heat generated in the DC paths 44 from becoming trapped in the encapsulating resin 33 of the capacitor module 3. As a result, the increase in the temperature of the capacitor elements 31 is effectively inhibited.

For example, during travel of the vehicle using the rotating electrical machine MG, a large current sometimes flows through the DC paths 44 between the DC power supply BAT and the switching circuit 20 (see arrows i in FIGS. 11 and 12). At this time, the DC paths 44 generate heat. If the DC paths 44 are located in the encapsulating resin 33, dissipation is hindered, which could lead to an increase in the temperature of the capacitor elements 31. In contrast, as described above, the DC paths 44 are located outside the encapsulating resin 33. Thus, the heat of the DC paths 44 is easily dissipated, and the increase in the temperature of the capacitor elements 31 is inhibited.

The power converter 1 includes the auxiliary capacitor module 5, and the auxiliary capacitor module 5 is connected to the power supply connection sections 43 of the capacitor bus bars 4. Thus, the capacitor module 3 and the auxiliary capacitor module 5 are connected to each other through the capacitor bus bars 4. Consequently, the current paths between the capacitor module 3 and the auxiliary capacitor module 5 are short. This reduces the inductance difference between the capacitor elements 31 and the capacitor elements 51. Thus, current resonance between the capacitor elements is reduced. As a result, generation of heat in the capacitor elements 31 and 51 is inhibited.

The auxiliary capacitor module 5 is detachably secured to the power supply connection sections 43 with the fastening members 11. Thus, the auxiliary capacitor module 5 is easily replaced. That is, the auxiliary capacitor module 5 is easily separated from the capacitor module 3 and the switching circuit 20. Consequently, for example, it is easy to replace only the auxiliary capacitor module 5.

The securing direction of the securing members 135, which secure the auxiliary capacitor module 5 to the device case 12, is the same as the securing direction of the fastening members 11, which secure the auxiliary capacitor module 5 to the power supply connection sections 43. Thus, it is easy to mount or replace the auxiliary capacitor module 5.

The positive electrode bus bar 4P and the negative electrode bus bar 4N each include the facing section 45 at part of their respective DC paths 44. The facing sections 45 face each other in the thickness direction with the insulation layer 46 located in between. The power supply connection sections 43 project from the facing sections 45 and the insulation layer 46 when viewed in the thickness direction. Thus, when the power supply connection sections 43 are connected, the load applied to the power supply connection sections 43 is easily inhibited from being transmitted to the encapsulating resin 33. This prevents problems such as cracks being formed at parts of the encapsulating resin 33 where the capacitor bus bars 4 project.

The facing sections 45 each include the main facing section 451 and the upright facing section 452, and the insulation layer 46 includes the main insulation section 461 and the upright insulation section 462. Each power supply connection section 43 is bent from the upright facing section 452 in the thickness direction of the upright facing section 452 and is formed to be parallel to the main facing section 451. With this configuration, stress applied to the power supply connection sections 43 is more efficiently inhibited from being transmitted to the encapsulating resin 33.

As described above, the present embodiment provides the power converter in which the heat of the bus bars is easily dissipated efficiently and the increase in the temperature of the capacitor elements is easily inhibited.

Second Embodiment

An embodiment of the capacitor module 3 will be described with reference to FIGS. 13 to 17.

As shown in FIGS. 13 to 15, and 17, the capacitor module 3 of the present embodiment includes the capacitor elements 31, the encapsulating resin 33, and the pair of capacitor bus bars 4. The encapsulating resin 33 encapsulates the capacitor elements 31. The pair of capacitor bus bars 4 are connected to the capacitor elements 31. Each capacitor bus bar 4 includes an exposed portion 40, which is exposed from the encapsulating resin 33. Each exposed portion 40 includes a plate-like portion 401, the power supply connection section 43, and the terminal connection sections 42. The power supply connection section 43 extends from the plate-like portion 401 and is electrically connected to the power supply. The terminal connection sections 42 extend from the plate-like portion 401 and are electrically connected to other electronic components (in the present embodiment, semiconductor modules described below). Each plate-like portion 401 includes a specific portion 404 in the region closer to the power supply connection section 43 than to the terminal connection sections 42. The specific portion 404 has a thickness smaller than that of the surrounding section.

The background art related to the present embodiment will now be described.

Japanese Laid-Open Patent Publication No. 2014-45035 discloses a capacitor that constitutes part of a power converter such as an inverter to be mounted on, for example, electric cars and hybrid cars. The capacitor disclosed in the above patent literature has the role of smoothing a DC voltage applied to semiconductor modules each formed by resin-molding of semiconductor elements constituting a power converting circuit.

The capacitor disclosed in the above patent literature includes capacitor elements in a capacitor case, and the capacitor elements are encapsulated by an encapsulating resin. A pair of bus bars are connected to pairs of electrodes of the capacitor elements. Each bus bar includes a power supply input terminal, which is connected to the power supply, and connection sections, which are connected to the semiconductor modules. The power supply input terminals and the connection sections of the bus bars are exposed from the encapsulating resin. Each power supply input terminal and the associated connection sections are electrically connected to each other inside the encapsulating resin.

The direct current that flows from the power supply to the capacitor includes a ripple component, which passes through the capacitor elements, and a DC component, which does not pass through the capacitor elements. The DC component does not pass through the capacitor elements but flows from the power supply input terminal to the connection sections through the bus bar located in the encapsulating resin.

Next, the problems to be solved by the capacitor module 3 of the present embodiment will be described.

In the capacitor disclosed in the above patent literature, the DC component of the input direct current also flows through the bus bar located in the encapsulating resin in addition to the ripple component. Thus, the amount of heat generated in the bus bar in the encapsulating resin is likely to increase, and the heat of the bus bar may possibly affect the capacitor elements. Furthermore, if the bus bar encapsulated in the encapsulating resin generates heat, the heat is likely to become trapped in the encapsulating resin and is hindered from being dissipated. Thus, it is not preferable that the bus bar generates heat in the encapsulating resin.

The present embodiment has been accomplished in view of the above problems and provides a capacitor in which the bus bars are easily inhibited from generating heat in the encapsulating resin.

The present embodiment will hereafter be described in detail.

The capacitor module 3 forms part of a power converter. The power converter may be a vehicle-mounted power converter provided on vehicles such as electric cars and hybrid cars. The power converter is located between the DC power supply and a three-phase alternating motor. The capacitor module 3 smooths the DC voltage applied from the DC power supply and outputs the smoothed DC voltage to the switching circuit. The DC voltage is converted to an AC voltage by the switching circuit. The AC voltage obtained in the above manner is applied to the three-phase alternating motor.

Figure 13:
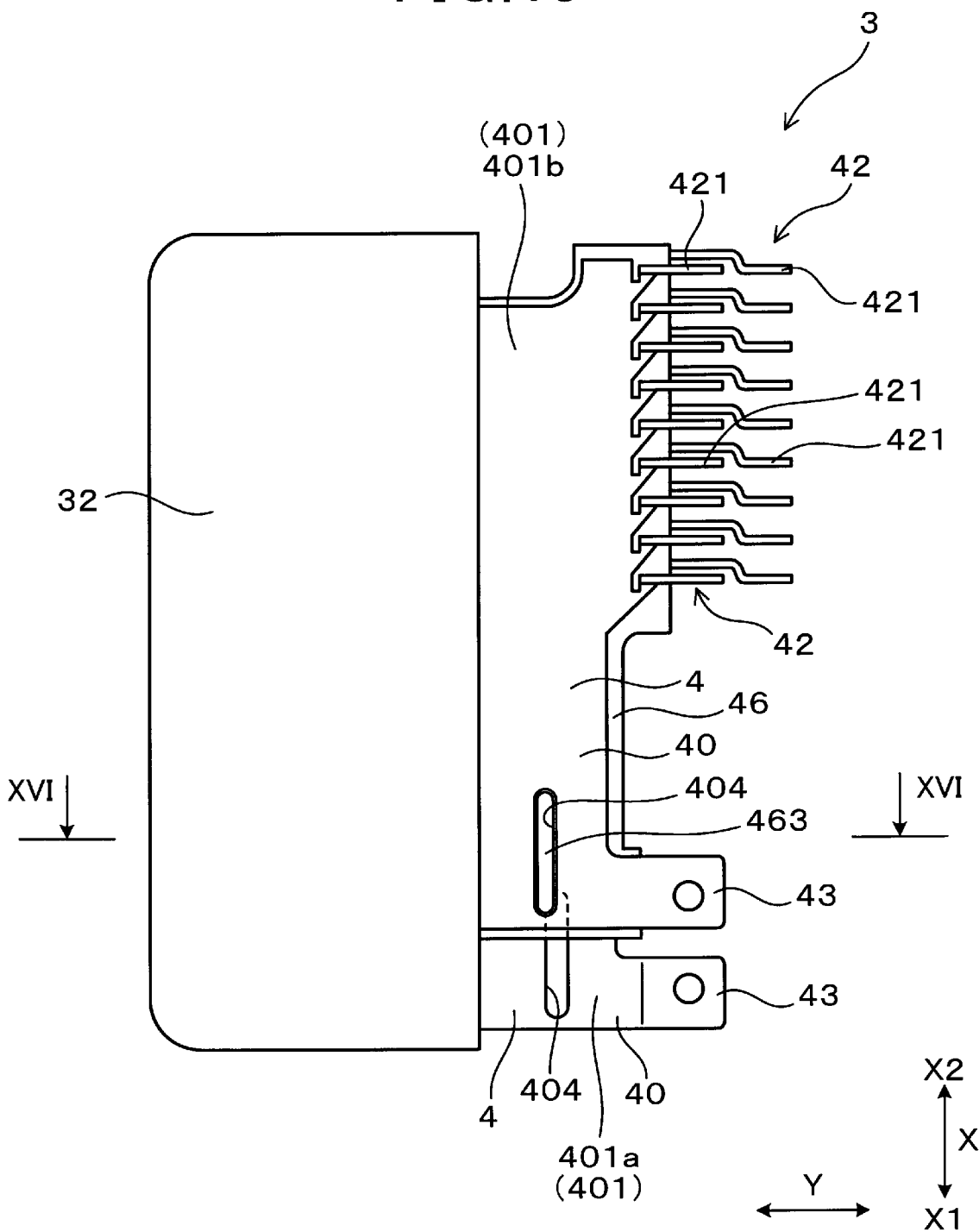
FIG. 13 is a plan view of a capacitor module according to a second embodiment.
Figure 14:
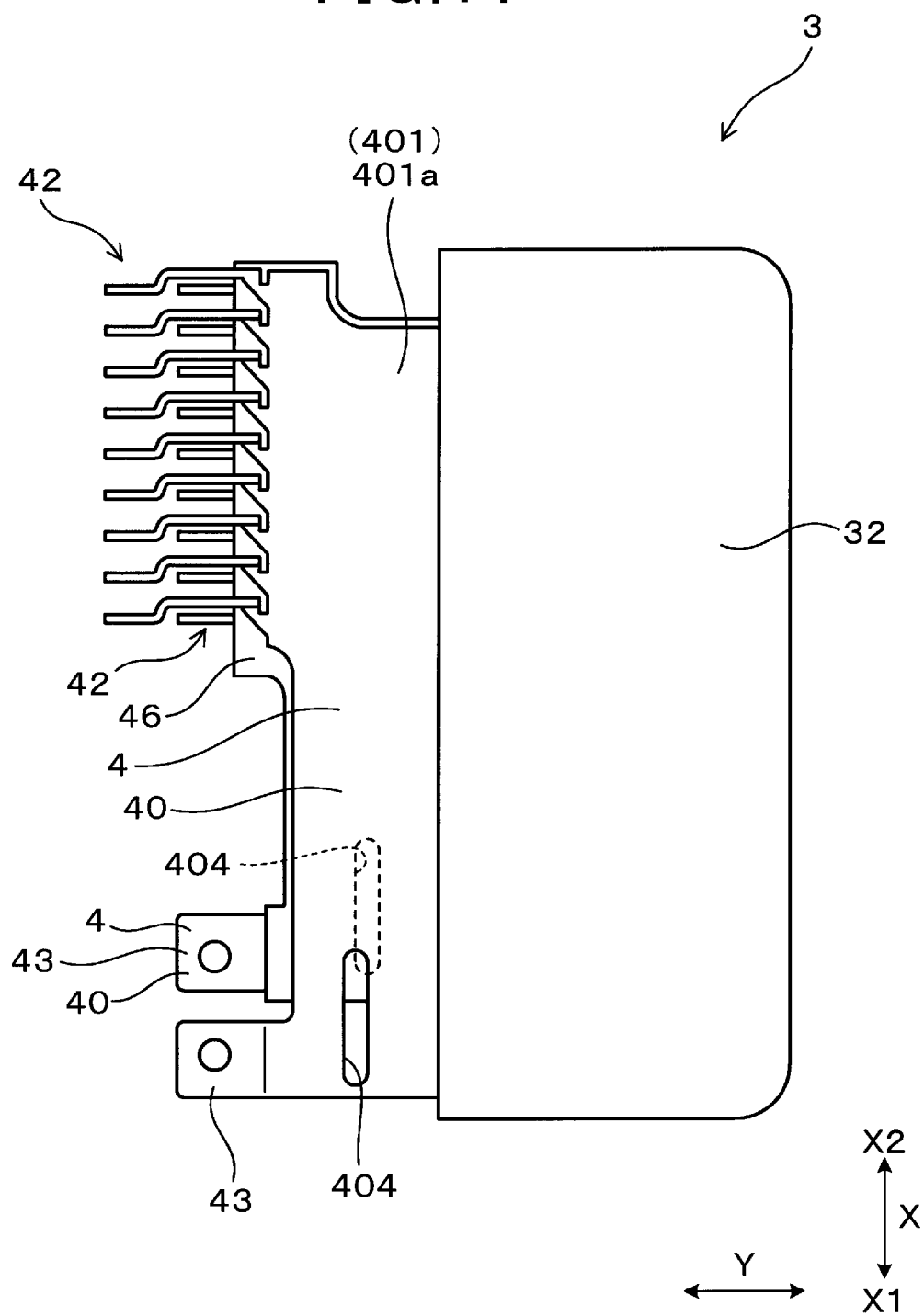
FIG. 14 is a rear view of the capacitor module according to the second embodiment.
Figure 15:
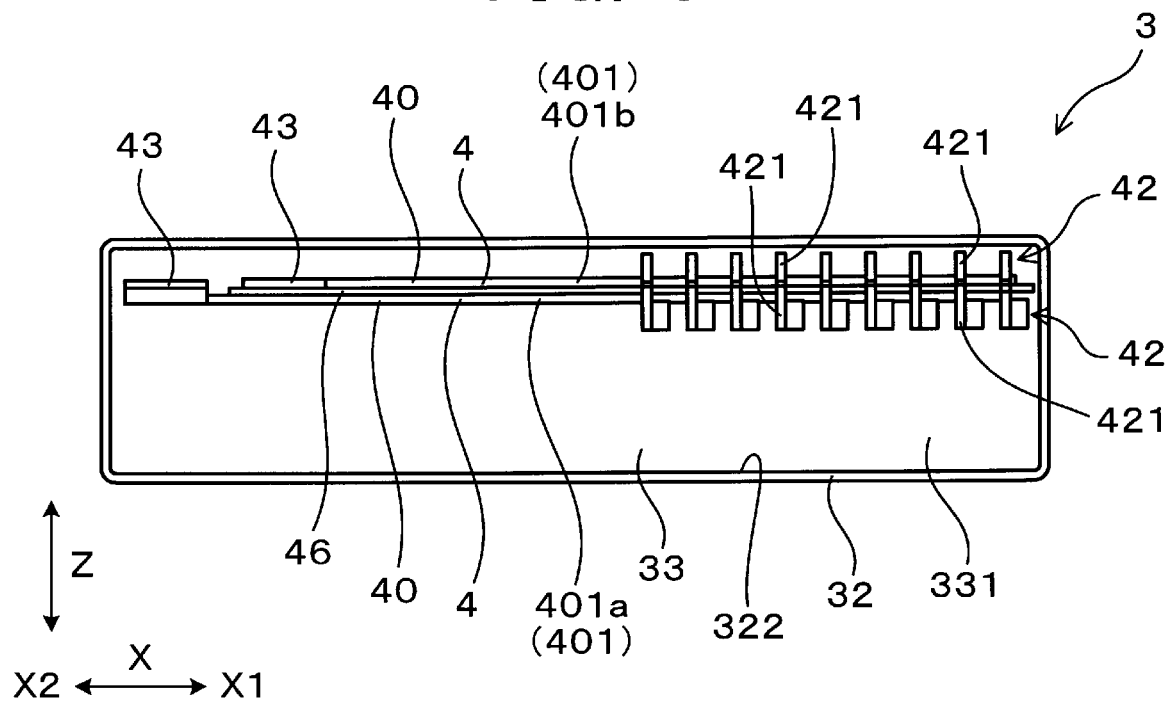
FIG. 15 is a side view of the capacitor module according to the second embodiment.

The capacitor elements 31 are accommodated in the capacitor case 32 as shown in FIGS. 13 to 15. The capacitor case 32 is shaped like a rectangular box with one side opened. When viewed in the direction in which the capacitor case 32 is opened, the capacitor case 32 has a rectangular shape. Hereinafter, the direction in which the capacitor case 32 is opened is referred to as a Y-direction, the longitudinal direction of the capacitor case 32 when viewed in the Y-direction will be referred to as an X-direction, and the transverse direction of the capacitor case 32 when viewed in the Y-direction will be referred to as a Z-direction. The Y-direction, the X-direction, and the Z-direction are orthogonal to one another.

As shown in FIG. 15, the capacitor case 32 is filled with the encapsulating resin 33, which encapsulates the capacitor elements 31. The encapsulating resin 33 may be formed of, for example, a thermosetting resin such as an epoxy resin. The encapsulating resin 33 includes a resin surface 331, which is exposed from an opening 322 of the capacitor case 32. The resin surface 331 is orthogonal to the Y-direction.

Figure 17:
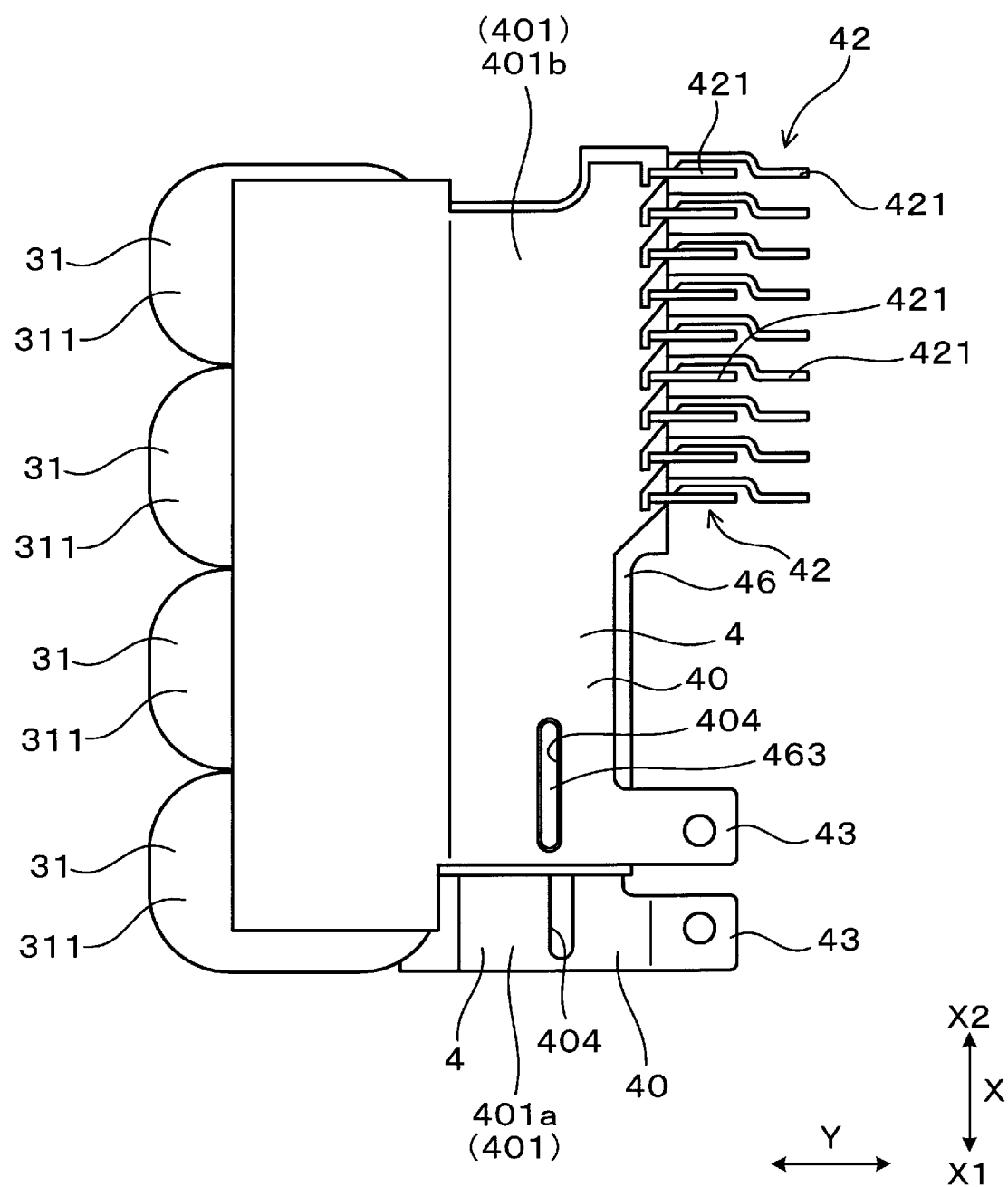
FIG. 17 is a plan view of the capacitor module according to the second embodiment without an encapsulating resin and a capacitor case.

As shown in FIGS. 13 and 17, the capacitor elements 31 are encapsulated in the capacitor case 32. Each capacitor element 31 is a film capacitor formed by winding metalized films. The capacitor elements 31 are arranged in a position so that the axial direction of each winding of the metalized films is oriented in the same direction (Z-direction).

As shown in FIG. 17, each capacitor element 31 has an oval shape when viewed in the Z-direction. A pair of electrode surfaces 311 are formed on the end surfaces of each capacitor element 31 in the Z-direction. The electrode surfaces 311 are formed by, for example, thermally spraying metal such as aluminum on both ends of the capacitor element 31 in the Z-direction where the electrode surfaces 311 are to be formed.

The pair of capacitor bus bars 4 are connected to the pairs of electrode surfaces 311 of the capacitor elements 31. The exposed portion 40 of each capacitor bus bar 4 is formed to be exposed to the outside of the resin surface 331 as shown in FIGS. 13 to 15. As described above, each exposed portion 40 includes the plate-like portion 401, the power supply connection section 43, and the terminal connection sections 42.

As shown in FIGS. 13 to 15, each plate-like portion 401 has a thickness in the Z-direction and is shaped like a substantially rectangular plate extending in the X-direction. One of the pair of plate-like portions 401 is longer than the other in the X-direction. Hereinafter, one of the pair of plate-like portions 401 longer than the other in the X-direction is referred to as a long plate-like portion 401a, and the plate-like portion 401 shorter than the other in the X-direction is referred to as a short plate-like portion 401b.

The long plate-like portion 401a projects from the short plate-like portion 401b in the direction close to the terminal connection sections 42 in the X-direction, and in the direction further from the terminal connection sections 42 in the X-direction (hereinafter, the side close to the terminal connection sections 42 is referred to as an X2-side, and the side further from the terminal connection sections 42 is referred to as an X1-side). The ends of the long plate-like portion 401a and the short plate-like portion 401b on the X-2 side in the X-direction are substantially aligned. As shown in FIG. 15, the pair of plate-like portions 401 partially face each other in the Z-direction.

As shown in FIGS. 13 to 15, each power supply connection section 43 projects from the end of the associated plate-like portion 401 on the same side (X2-side) in the X-direction to extend away from the resin surface 331 in the Y-direction. The pair of power supply connection sections 43 are formed on the same plane. The power supply connection section 43, which extends from the short plate-like portion 401b, is flush with the short plate-like portion 401b. The power supply connection section 43, which extends from the long plate-like portion 401a, is bent in a step shape at the connection section with the long plate-like portion 401a as shown in FIG. 15, so that the section opposite to the connection section is flush with the power supply connection section 43, which is connected to the short plate-like portion 401b. As described above, since the long plate-like portion 401a projects toward the X1-side in the X-direction, the power supply connection section 43, which extends from the long plate-like portion 401a, is formed to be further than the power supply connection section 43, which extends from the short plate-like portion 401b, on the X1-side.

As shown in FIGS. 13 and 14, the terminal connection sections 42 project from the region of each plate-like portion 401 on the X2-side to extend away from the resin surface 331 in the Y-direction. The terminal connection sections 42 are formed in the region of each plate-like portion 401 on the X2-side from substantially the middle in the X-direction. In the present embodiment, the terminal connection sections 42 are connected to terminals (not shown) of the semiconductor modules constituting the switching circuit. As shown in FIGS. 13 to 15, the terminal connection sections 42 and the power supply connection sections 43 are arranged next to each other in the X-direction.

As shown in FIGS. 13 to 15, the terminal connection sections 42 include module connection sections 421 formed at equal intervals in the X-direction. The module connection sections 421 are to be connected to the terminals of the semiconductor modules. The module connection sections 421 are plates having a thickness in the X-direction and are connected to the terminals of the semiconductor modules in the X-direction. The module connection sections 421 are formed on each plate-like portion 401 up to the end on the X2-side. The terminal connection sections 42, which extend from the long plate-like portion 401a, and the terminal connection sections 42, which extend from the short plate-like portion 401b, are arranged next to each other in the Y-direction when viewed from the Z-direction, but are located at different positions from each other in the Z-direction.

Each plate-like portion 401 includes the specific portion 404. As shown in the schematic diagram of FIG. 16, the specific portion 404 is a through-hole that is formed through the plate-like portion 401 in the thickness direction (that is, the Z-direction). As shown in FIGS. 13 and 14, the specific portions 404 are elongated in the direction in which the power supply connection sections 43 and the terminal connection sections 42 are arranged (that is, the X-direction). In the present embodiment, the specific portions 404 have an oval shape extending in the X-direction. The length of the specific portions 404 in the X-direction is greater than the length of the power supply connection sections 43 in the X-direction.

Each specific portion 404 extends short of the edge of the associated plate-like portion 401 on the X1-side. That is, part of the plate-like portion 401 exists on the X1-side of the specific portion 404 of the plate-like portion 401. The size of the part of the plate-like portion 401 that exists on the X1-side of the specific portion 404 of the plate-like portion 401 in the X-direction is half or less than half the length of the power supply connection section 43 in the X-direction.

As shown in FIGS. 13 and 14, each specific portion 404 is formed in the region closer to the power supply connection section 43 than to the terminal connection sections 42. That is, the shortest distance through the plate-like portion 401 from the specific portion 404 to the power supply connection section 43 is shorter than that from the specific portion 404 to the terminal connection sections 42.

At least part of the specific portion 404 is formed in the region where the power supply connection section 43 faces the encapsulating resin 33. That is, at least part of the specific portion 404 is located in the region between the power supply connection section 43 and the resin surface 331 in the Y-direction in which the power supply connection section 43 and the resin surface 331 of the encapsulating resin 33 face each other. The specific portion 404 is formed at substantially the middle of the plate-like portion 401 in the Y-direction.

As shown in FIGS. 13 to 15, the insulation layer 46 is located between the pair of plate-like portions 401 to insulate the plate-like portions 401 from each other. The insulation layer 46 is shaped like a sheet. As shown in FIG. 13, the insulation layer 46 is larger than the short plate-like portion 401b when viewed in the Z-direction. The short plate-like portion 401b is located to be inside the insulation layer 46.

Figure 16:
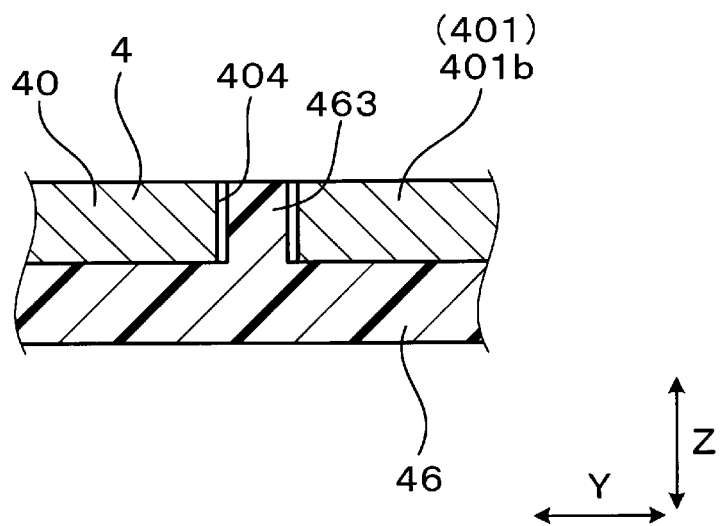
FIG. 16 is a cross-sectional view taken in the direction of arrows along line XVI-XVI of FIG. 13 illustrating the capacitor bus bar and an insulation layer.

As shown in FIGS. 13 and 16, the insulation layer 46 includes a position determining portion 463, which projects toward the short plate-like portion 401b in the Z-direction. The position determining portion 463 is inserted in the specific portion 404 (through-hole) of the short plate-like portion 401b. The outer shape and the size of the position determining portion 463 when viewed in the Z-direction are substantially the same as the outer shape and the size of the specific portion 404 when viewed in the Z-direction. Thus, the position of the insulation layer 46 is determined with respect to the short plate-like portion 401b.

Next, the operational advantages of the present embodiment will be described.

In the capacitor module 3 of the present embodiment, the exposed portion 40 of each capacitor bus bar 4 exposed from the encapsulating resin 33 includes the power supply connection section 43 and the terminal connection sections 42. Thus, the DC component of the direct current that flows into the capacitor bus bar 4 through the power supply connection section 43 passes through the plate-like portion 401 and flows out through the terminal connection sections 42. This prevents the DC component of the direct current from flowing through the capacitor bus bar 4 located inside the encapsulating resin 33.

Each plate-like portion 401 includes the specific portion 404, which has a thickness smaller than that of the surrounding section. Thus, the plate-like portion 401 has an increased electrical resistivity at and around the specific portion 404. The specific portion 404 is formed in the region of each plate-like portion 401 closer to the power supply connection section 43 than to the terminal connection sections 42. Thus, the electrical resistivity of the region of each plate-like portion 401 closer to the power supply connection section 43 than to the terminal connection sections 42 is made high. Thus, the DC component of the direct current that flowed into the power supply connection section 43 is easily guided toward the terminal connection sections 42. Consequently, the DC component of the direct current that flowed into the plate-like portion 401 through the power supply connection section 43 is easily prevented from flowing toward the capacitor bus bar 4 in the encapsulating resin 33.

Each specific portion 404 is a through-hole that extends through the associated plate-like portion 401 in the thickness direction. Thus, the electrical resistivity of the specific portion 404 and the surrounding section is easily increased. This further prevents the DC component of the direct current that flowed in through the power supply connection section 43 from passing through and around the specific portion 404 of the plate-like portion 401. Thus, the DC component of the direct current that flowed in through the power supply connection section 43 is further prevented from flowing into the capacitor bus bar 4 in the encapsulating resin 33 through the plate-like portion 401. Furthermore, since the specific portion 404 is easily formed, the productivity of the capacitor module 3 is easily improved.

The insulation layer 46 includes the position determining portion 463, which is inserted in the specific portion 404. Thus, the specific portion 404 can be used to determine the position of the insulation layer 46. This eliminates the need for providing an additional mechanism for determining the position of the insulation layer 46 and results in the reduction in the number of parts.

At least part of the specific portion 404 is formed in the region where the power supply connection section 43 and the encapsulating resin 33 face each other. This increases the electrical resistivity of the region on the plate-like portion 401 that is the shortest route between the power supply connection section 43 and the capacitor bus bar 4 in the encapsulating resin 33. Thus, the DC component of the direct current that flowed in through the power supply connection section 43 is further prevented from flowing into the capacitor bus bar 4 in the encapsulating resin 33 through the plate-like portion 401.

The specific portion 404 is formed in the region closer to the power supply connection section 43 than to the terminal connection sections 42. This increases the electrical resistivity of the region of the plate-like portion 401 closer to the power supply connection section 43. Thus, the DC component of the direct current that has flowed into the power supply connection section 43 is more easily guided toward the terminal connection sections 42. Consequently, the DC component of the direct current that has flowed into the plate-like portion 401 through the power supply connection section 43 is more easily prevented from flowing toward the capacitor bus bar 4 in the encapsulating resin 33.

As described above, the present embodiment provides a capacitor that easily inhibits the capacitor elements and the encapsulating resin from receiving heat.

Third Embodiment

Figure 18:
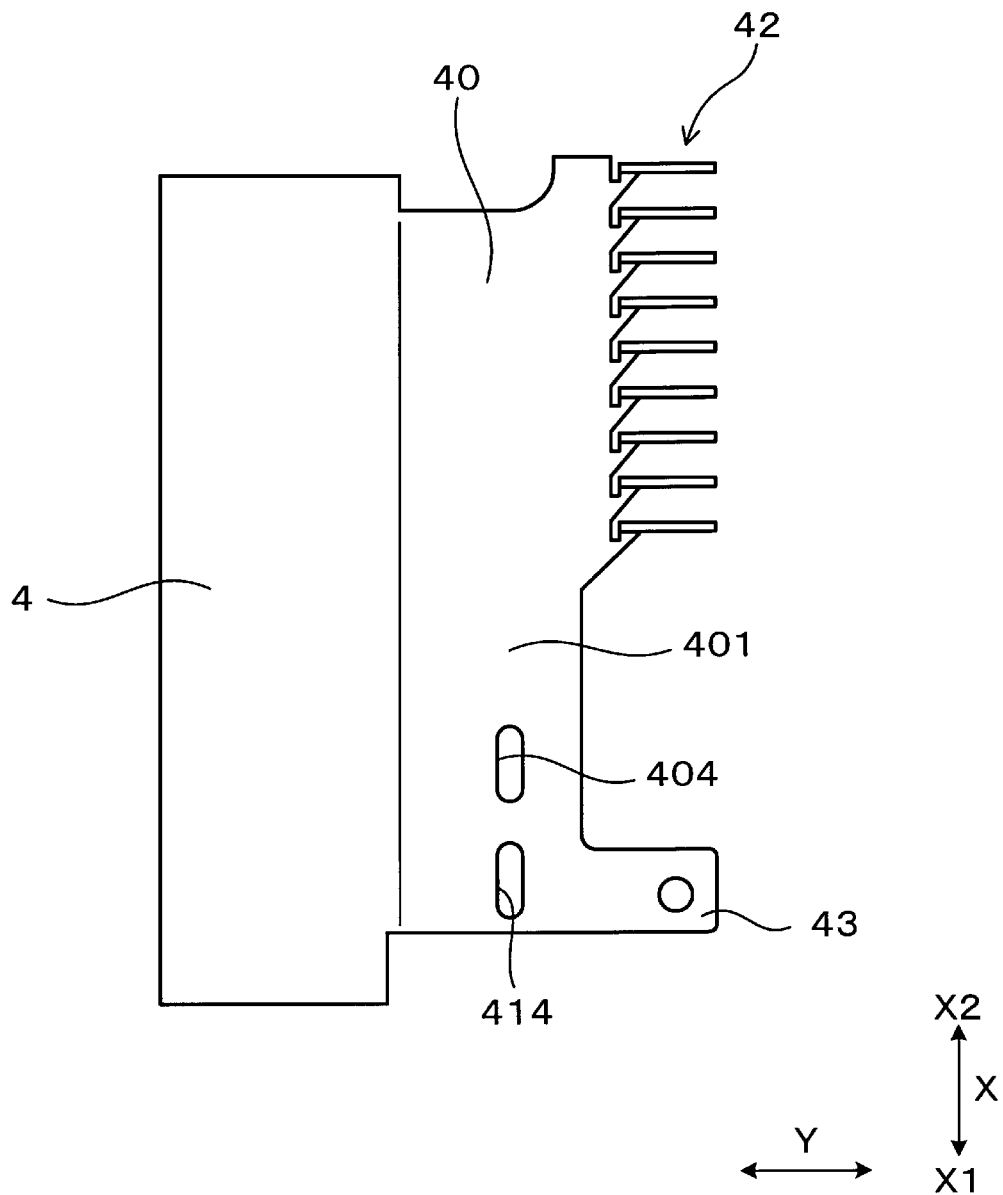
FIG. 18 is a plan view of a capacitor bus bar according to a third embodiment.

The present embodiment is a modification of the second embodiment in which the structure of the specific portion 404 is changed as shown in FIG. 18.

In the present embodiment, each plate-like portion 401 includes multiple specific portions 404. In the present embodiment, each plate-like portion 401 includes two specific portions 404. The two specific portions 404 have an oval shape extending in the X-direction and are located next to each other in the X-direction. In each plate-like portion 401, one of the specific portions 404 is located in a region where the power supply connection section 43 and the encapsulating resin (refer to reference number 33 in FIG. 15) face each other. The other one of the specific portions 404 is located at a position adjacent to the above specific portion 404 on the X2-side. Part of the capacitor bus bar 4 exists on both sides of each specific portion 404 in the X-direction in each plate-like portion 401.

Others are the same as those of the second embodiment.

The reference numerals used in the third embodiment and in the following embodiments that are the same as those used in the already discussed embodiments represent equivalent components as those in the already discussed embodiments unless otherwise specified.

In the present embodiment, each plate-like portion 401 includes the multiple specific portions 404. Thus, compared with a case in which each plate-like portion 401 includes one large specific portion 404, the rigidity of each plate-like portion 401 is increased, which improves the natural frequency of each plate-like portion 401. Thus, the strength of each plate-like portion 401 against vibration is improved.

Additionally, the same operational advantages as those of the second embodiment are achieved.

Fourth Embodiment

Figure 19:
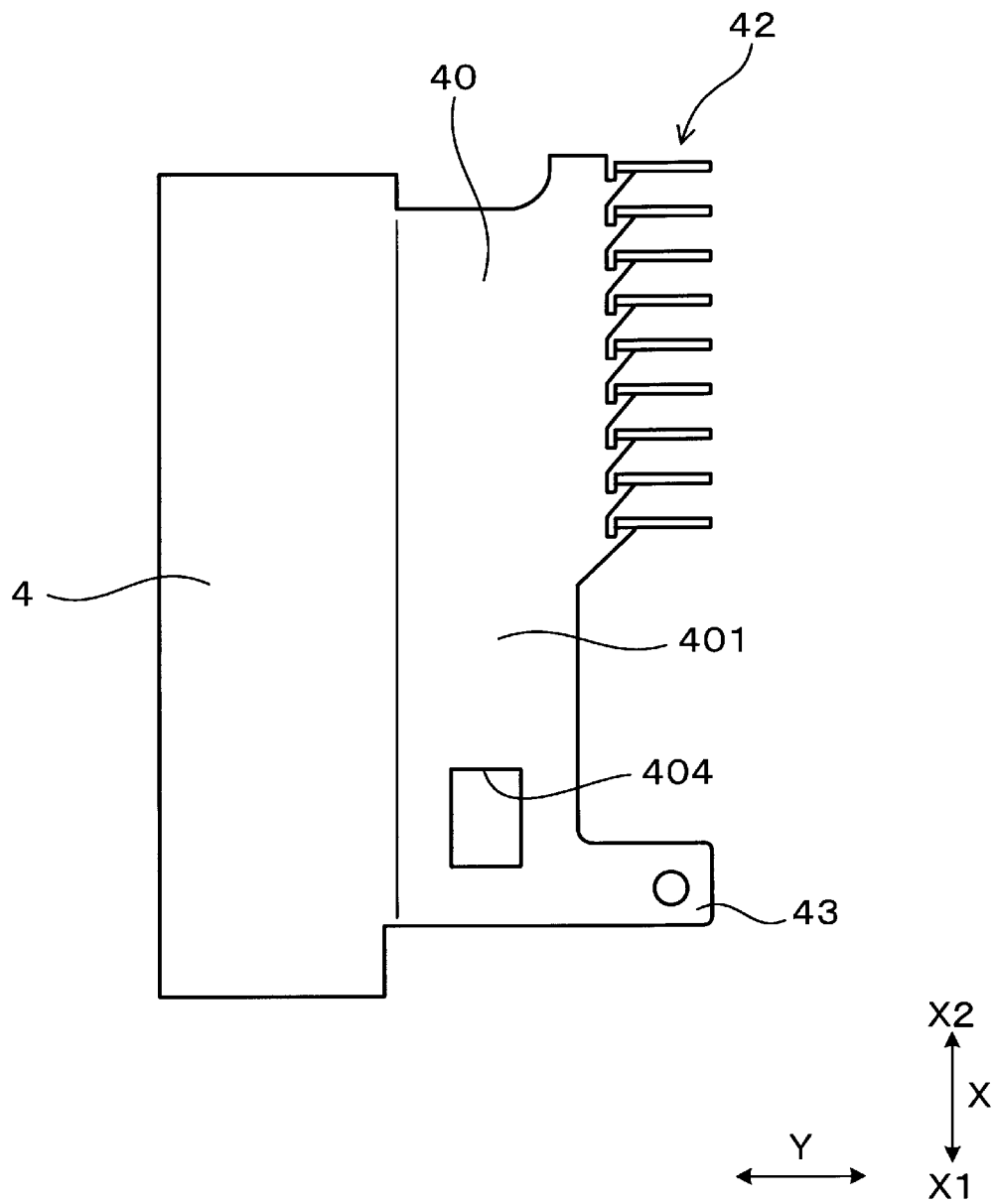
FIG. 19 is a plan view of a capacitor bus bar according to a fourth embodiment.

As shown in FIG. 19, the present embodiment is also a modification of the second embodiment in which the structure of the specific portion 404 is changed.

In the present embodiment, the specific portion 404 has a rectangular shape that is slightly longer in the X-direction.

Others are the same as those of the second embodiment.

In the present embodiment also, the same operational advantages as those of the second embodiment are achieved.

Fifth Embodiment

Figure 20:
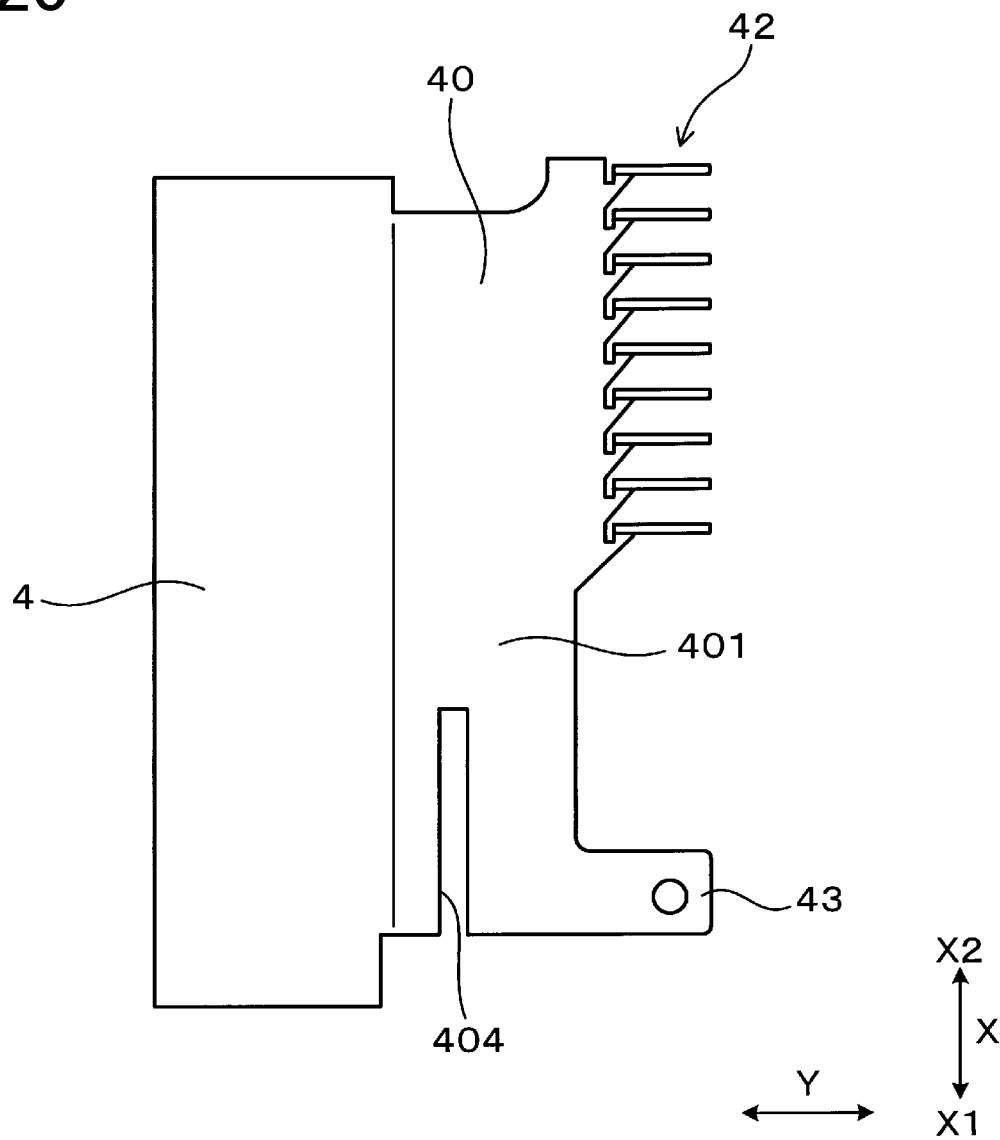
FIG. 20 is a plan view of a capacitor bus bar according to a fifth embodiment.

As shown in FIG. 20, the present embodiment is a modification of the second embodiment in which the structure of the specific portion 404 is changed.

The specific portion 404 is connected to the edge of the plate-like portion 401 further from the terminal connection sections 42 (X1-side). That is, the specific portion 404 is open on the X1-side. The specific portion 404 is a long slit extending in the X-direction.

Others are the same as those of the second embodiment.

In the present embodiment, the DC component of the direct current input to the plate-like portion 401 through the power supply connection section 43 is easily prevented from flowing toward the capacitor bus bar 4 in the encapsulating resin 33 through the X1-side of the specific portion 404 of the plate-like portion 401. Thus, the DC component of the direct current input to the plate-like portion 401 through the power supply connection section 43 is more easily guided toward the terminal connection sections 42.

Additionally, the same operational advantages as those of the second embodiment are achieved.

Figure 21:
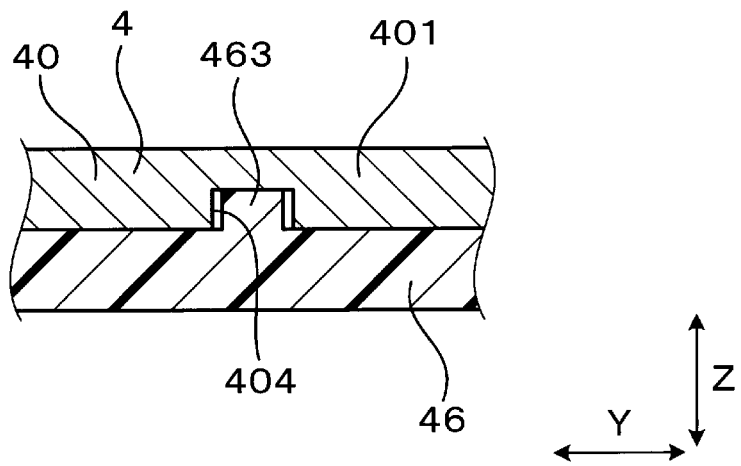
FIG. 21 is a cross-sectional view of a capacitor bus bar and an insulation layer according to another embodiment corresponding to the cross-sectional view of FIG. 16.

Although the present disclosure has been described in accordance with the embodiments, it is understood that the present disclosure is not limited to the embodiments and the configurations. The present disclosure embraces various modifications and deformations that come within the range of equivalency. Additionally, various combinations and forms, or other combinations and forms including only one or more additional elements, or less than all elements are included in the scope and ideas obtainable from the present disclosure. For example, as shown in FIG. 21, the specific portion 404 may be a recess instead of a through-hole. In this case, the position of the insulation layer 46 with respect to the capacitor bus bar 4 may be determined by inserting the position determining portion 463 of the insulation layer 46 according to the second embodiment inside the recess of the capacitor bus bar 4.

One aspect of the present disclosure provides a power converter, which includes a switching circuit and a capacitor module. The capacitor module is electrically connected to the switching circuit. The capacitor module includes a capacitor element, a capacitor case, an encapsulating resin, and a capacitor bus bar. The capacitor case accommodates the capacitor element. The encapsulating resin encapsulates the capacitor element in the capacitor case. The capacitor bus bar connects the capacitor element to a power terminal of the switching circuit. The capacitor bus bar includes an element connection section, a terminal connection section, and a power supply connection section. The element connection section is connected to the capacitor element inside the encapsulating resin. The terminal connection section is connected to the power terminal outside the encapsulating resin. The power supply connection section is connected to power supply wiring outside the encapsulating resin. The power supply wiring is electrically connected to a DC power supply. The capacitor bus bar includes a DC path, which constitutes a current path between the terminal connection section and the power supply connection section. The DC path is exposed to the outside of the encapsulating resin.

Another aspect of the present disclosure provides a capacitor module, which includes a capacitor element, an encapsulating resin, and a pair of capacitor bus bars. The encapsulating resin encapsulates the capacitor element. The pair of capacitor bus bars are connected to the capacitor element. Each capacitor bus bar includes an exposed portion, which is exposed from the encapsulating resin. Each exposed portion includes a plate-like portion, a power supply connection section, and a terminal connection section. The power supply connection section extends from the plate-like portion and is electrically connected to a power supply. The terminal connection section extends from the plate-like portion and is electrically connected to another electronic component. Each plate-like portion includes a specific portion at a region closer to the power supply connection section than to the terminal connection section. The specific portion has a thickness smaller than that of a surrounding section.

According to the one aspect of the power converter, the DC path, which constitutes the current path between the terminal connection section and the power supply connection section in the capacitor bus bar, is exposed to the outside of the encapsulating resin. Thus, if a large current flows through the DC path, which extends from the power supply connection section to the terminal connection section, heat caused by the current is easily dissipated efficiently. This prevents the heat generated in the DC path from becoming trapped in the encapsulating resin of the capacitor module. As a result, the increase in the temperature of the capacitor element is effectively inhibited.

According to the capacitor module of another aspect, the exposed portion of the capacitor bus bar exposed from the encapsulating resin includes the power supply connection section and the terminal connection section. Thus, the DC component of the direct current that flows into the capacitor bus bar through the power supply connection section passes through the plate-like portion and flows out through the terminal connection section. This prevents the DC component of the direct current from flowing through the capacitor bus bar located inside the encapsulating resin.

Each plate-like portion includes the specific portion having a thickness smaller than that of the surrounding section. Thus, the plate-like portion has an increased electrical resistivity at and around the specific portion. The specific portion is formed in the region of each plate-like portion closer to the power supply connection section than to the terminal connection section. Thus, the electrical resistivity of the region of each plate-like portion closer to the power supply connection section than to the terminal connection section is made high. Thus, the DC component of the direct current that has flowed into the power supply connection section is easily guided toward the terminal connection section. Consequently, the DC component of the direct current that has flowed into the plate-like portion through the power supply connection section is easily prevented from flowing toward the capacitor bus bar in the encapsulating resin.

As described above, each of the above aspects provides a power converter and a capacitor module in which the heat of the bus bar is easily dissipated efficiently and the increase in the temperature of the capacitor element is easily inhibited.

What is claimed is:

1. A power converter comprising:
a switching circuit;
a capacitor module which is electrically connected to the switching circuit;
an auxiliary capacitor module which is parallel-connected to the capacitor module; and
a device case which accommodates the switching circuit, the capacitor module, and the auxiliary capacitor module, wherein:
the capacitor module includes
a capacitor element,
a capacitor case which accommodates the capacitor element,
an encapsulating resin which encapsulates the capacitor element in the capacitor case, and
a capacitor bus bar which connects the capacitor element to a power terminal of the switching circuit;
the capacitor bus bar includes
an element connection section which is connected to the capacitor element inside the encapsulating resin,
a terminal connection section which is connected to the power terminal outside the encapsulating resin, and
a power supply connection section which is connected to power supply wiring outside the encapsulating resin, the power supply wiring being electrically connected to a DC power supply;
the capacitor bus bar includes a DC path which constitutes a current path between the terminal connection section and the power supply connection section, an entirety of the DC path being exposed to the outside of the encapsulating resin;
the auxiliary capacitor module is connected to the power supply connection section of the capacitor bus bar;
the auxiliary capacitor module is detachably secured to the power supply connection section with a fastening member; and
a securing direction of a securing member, which secures the auxiliary capacitor module, and a securing direction of the fastening member are the same as each other.

2. The power converter according to claim 1, wherein:
the capacitor bus bar of the capacitor module includes a positive electrode bus bar and a negative electrode bus bar, which are connected to opposite electrodes of the capacitor element;
the positive electrode bus bar and the negative electrode bus bar each include a facing section at part of their respective DC paths, the facing sections facing each other in a thickness direction with an insulation layer located in between; and
the power supply connection sections project from the facing sections and the insulation layer when viewed in the thickness direction.

3. The power converter according to claim 2, wherein:
each facing section includes a flat main facing section and an upright facing section, which extends upright from the main facing section in the thickness direction of the main facing section;
the insulation layer includes a main insulation section, which is located between the pair of main facing sections, and an upright insulation section, which is located between the pair of upright facing sections; and
the power supply connection section is bent from the upright facing section in the thickness direction of the upright facing section and is formed to be parallel to the main facing section.

4. A power converter comprising:
a switching circuit; and
a capacitor module, which is electrically connected to the switching circuit, wherein:
the capacitor module includes
a capacitor element,
a capacitor case, which accommodates the capacitor element,
an encapsulating resin, which encapsulates the capacitor element in the capacitor case, and
a capacitor bus bar, which connects the capacitor element to a power terminal of the switching circuit;
the capacitor bus bar includes
an element connection section, which is connected to the capacitor element inside the encapsulating resin,
a terminal connection section, which is connected to the power terminal outside the encapsulating resin, and
a power supply connection section, which is connected to power supply wiring outside the encapsulating resin, the power supply wiring being electrically connected to a DC power supply;
the capacitor bus bar includes a DC path, which constitutes a current path between the terminal connection section and the power supply connection section, an entirety of the DC path being exposed to the outside of the encapsulating resin;
the capacitor bus bar of the capacitor module includes a positive electrode bus bar and a negative electrode bus bar, which are connected to opposite electrodes of the capacitor element;
the positive electrode bus bar and the negative electrode bus bar each include a facing section at part of their respective DC paths, the facing sections facing each other in a thickness direction with an insulation layer located in between;
the power supply connection sections project from the facing sections and the insulation layer when viewed in the thickness direction;

each facing section includes a flat main facing section and an upright facing section, which extends upright from the main facing section in the thickness direction of the main facing section;

the insulation layer includes a main insulation section, which is located between the pair of main facing sections, and an upright insulation section, which is located between the pair of upright facing sections; and the power supply connection section is bent from the upright facing section in the thickness direction of the upright facing section and is formed to be parallel to the main facing section.

5. The power converter according to claim 4, comprising an auxiliary capacitor module, which is parallel-connected to the capacitor module, wherein the auxiliary capacitor module is connected to the power supply connection section of the capacitor bus bar.

6. The power converter according to claim 5, wherein the auxiliary capacitor module is detachably secured to the power supply connection section with a fastening member.

\* \* \* \* \*